United States Patent
Osborne et al.

(10) Patent No.: US 11,205,896 B2
(45) Date of Patent: Dec. 21, 2021

(54) SOLAR POWER SYSTEM

(71) Applicant: BLACK & DECKER INC., New Britain, CT (US)

(72) Inventors: Stephen P. Osborne, Glen Arm, MD (US); Dharmendra Rathod, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 16/680,681

(22) Filed: Nov. 12, 2019

(65) Prior Publication Data

US 2020/0395759 A1   Dec. 17, 2020

Related U.S. Application Data

(60) Provisional application No. 62/770,256, filed on Nov. 21, 2018.

(51) Int. Cl.

| | |
|---|---|
| H02J 3/38 | (2006.01) |
| H02S 40/30 | (2014.01) |
| H02S 40/32 | (2014.01) |
| H02S 40/38 | (2014.01) |
| H02J 13/00 | (2006.01) |
| H02J 7/35 | (2006.01) |
| H02J 3/14 | (2006.01) |

(52) U.S. Cl.
CPC .............. *H02J 3/381* (2013.01); *H02J 3/14* (2013.01); *H02J 7/35* (2013.01); *H02J 13/00002* (2020.01); *H02J 13/00006* (2020.01); *H02S 40/30* (2014.12); *H02S 40/32* (2014.12); *H02S 40/38* (2014.12); *H02J 2300/26* (2020.01)

(58) Field of Classification Search
CPC ...... H02J 3/14; H02J 3/38; H02J 3/381; H02J 3/383; H02J 13/00; H02J 7/35; H02J 7/007; H02J 7/0021; H02J 1/00; H02S 40/30–44; G06F 1/26; G06F 1/30
USPC ............................ 307/24, 66, 64, 80, 23, 68
See application file for complete search history.

(56) References Cited

U.S. PATENT DOCUMENTS

| | | | |
|---|---|---|---|
| 3,568,771 | A | 3/1971 | Vincent et al. |
| 4,284,943 | A | 8/1981 | Rowe |
| 4,303,833 | A | 12/1981 | Eckel et al. |
| 4,396,150 | A | 8/1983 | Burrough |
| 4,492,523 | A | 1/1985 | Knox |
| 4,535,813 | A | 8/1985 | Spain |
| 4,586,879 | A | 5/1986 | Slater |

(Continued)

FOREIGN PATENT DOCUMENTS

| | | |
|---|---|---|
| CN | 103449547 B | 12/2014 |
| DE | 3831142 A1 | 4/1989 |

(Continued)

*Primary Examiner* — Rexford N Barnie
*Assistant Examiner* — Terrence R Willoughby
(74) *Attorney, Agent, or Firm* — Scott B. Markow

(57) ABSTRACT

A solar power system and method of operation includes a solar array, a plurality of loads electrically coupled in parallel to the solar array, and a control circuit electrically coupled to the solar array and in communication with the loads. The control circuit is configured to cause the solar array to operate at a maximum power point (MPP), prioritize power requirements of the loads, and variably allocate power from the solar array among the loads according to the prioritized power requirements of the loads.

23 Claims, 13 Drawing Sheets

(56) References Cited

U.S. PATENT DOCUMENTS

| | | |
|---|---|---|
| 4,603,735 A | 8/1986 | Black |
| 4,666,376 A | 5/1987 | Solomon |
| 4,718,824 A | 1/1988 | Cholet et al. |
| 4,720,978 A | 1/1988 | Spacer |
| 4,755,942 A | 7/1988 | Gardner et al. |
| 4,765,144 A | 8/1988 | Spacer |
| 4,788,545 A | 11/1988 | Farque |
| 4,802,829 A | 2/1989 | Miller |
| 4,852,802 A | 8/1989 | Iggulden et al. |
| 4,876,647 A | 10/1989 | Gardner et al. |
| 4,916,328 A * | 4/1990 | Culp, III .................. H02J 3/14 |
| | | 307/39 |
| 4,980,574 A | 12/1990 | Cirrito |
| 5,067,272 A | 11/1991 | Constantz |
| 5,160,214 A | 11/1992 | Sakurai et al. |
| 5,466,127 A | 11/1995 | Arnswald |
| 5,543,667 A * | 8/1996 | Shavit ....................... H02J 3/14 |
| | | 307/39 |
| 5,569,998 A | 10/1996 | Cowan |
| 5,598,661 A | 2/1997 | Eiderman et al. |
| 5,992,517 A | 11/1999 | McAnally |
| 6,086,339 A | 7/2000 | Jeffrey |
| 6,092,598 A | 7/2000 | Breit |
| 6,189,811 B1 | 2/2001 | Rudy |
| 6,405,994 B1 | 6/2002 | Chen |
| 6,405,995 B1 | 6/2002 | Spain |
| 6,442,352 B1 | 8/2002 | Ito |
| 6,590,793 B1 | 7/2003 | Nagao et al. |
| 6,676,837 B2 | 1/2004 | Keeton, Jr. |
| 6,782,310 B2 | 8/2004 | Bailey et al. |
| 6,889,922 B1 | 5/2005 | Knight et al. |
| 6,892,113 B1 | 5/2005 | Addink et al. |
| 6,922,348 B2 | 7/2005 | Nakajima et al. |
| 7,021,910 B1 | 4/2006 | Huang et al. |
| 7,048,204 B1 | 5/2006 | Addink et al. |
| 7,126,294 B2 | 10/2006 | Minami et al. |
| 7,201,333 B2 | 4/2007 | Yoshikawa et al. |
| 7,359,769 B2 | 4/2008 | Bailey et al. |
| 7,400,944 B2 | 7/2008 | Bailey et al. |
| 7,624,800 B2 | 12/2009 | Jamieson et al. |
| 7,837,450 B2 | 11/2010 | Moreland |
| 7,878,429 B2 | 2/2011 | Parod et al. |
| 7,886,820 B2 | 2/2011 | Onedera et al. |
| 8,337,170 B2 | 12/2012 | Abdullah |
| 8,347,953 B1 | 1/2013 | Elizondo, Jr. et al. |
| 8,413,966 B1 | 4/2013 | Al-Anzi |
| 8,479,648 B2 | 7/2013 | Lyle et al. |
| 8,494,683 B2 | 7/2013 | Piper et al. |
| 8,517,289 B2 | 8/2013 | Parod et al. |
| 8,545,194 B2 | 10/2013 | Irving et al. |
| 8,606,415 B1 | 12/2013 | Woytowitz et al. |
| 8,680,838 B2 | 3/2014 | Saussele |
| 8,684,078 B2 | 4/2014 | Boyles et al. |
| 8,844,516 B2 | 9/2014 | Jones et al. |
| 8,876,026 B2 | 11/2014 | Pfrenger |
| 8,924,032 B2 | 12/2014 | Woytowitz et al. |
| 9,142,960 B2 | 9/2015 | Williams et al. |
| 9,161,499 B2 | 10/2015 | Bailey et al. |
| 9,267,263 B2 | 2/2016 | Bertrand et al. |
| 9,271,453 B2 | 3/2016 | Frager |
| 9,301,442 B1 | 4/2016 | Al-Wasis |
| 9,374,950 B2 | 6/2016 | Upadhyaya et al. |
| 9,400,122 B2 | 7/2016 | Kim et al. |
| 9,419,556 B2 | 8/2016 | Shenoy et al. |
| 9,461,535 B2 | 10/2016 | Abido et al. |
| 9,506,751 B2 | 11/2016 | Zhao |
| 9,512,828 B2 | 12/2016 | Marble et al. |
| 9,544,744 B2 | 1/2017 | Postrel |
| 9,579,864 B2 | 2/2017 | Lyle et al. |
| 9,590,425 B2 | 3/2017 | Abido et al. |
| 9,689,758 B2 | 6/2017 | Zhao |
| 9,781,887 B2 | 10/2017 | Woytowitz et al. |
| 9,847,440 B2 | 12/2017 | Jang |
| 9,865,903 B1 | 1/2018 | Petrella |
| 9,978,275 B2 | 5/2018 | Myer |
| 10,028,454 B2 | 7/2018 | Williams et al. |
| 10,038,321 B2 | 7/2018 | Gupta et al. |
| 10,098,292 B2 | 10/2018 | Alkhazraji |
| 10,263,430 B2 | 4/2019 | Narla |
| 10,305,286 B2 | 5/2019 | Narla |
| 2002/0010516 A1 | 1/2002 | Addink et al. |
| 2003/0109964 A1 | 6/2003 | Addink et al. |
| 2003/0169006 A1 | 9/2003 | Allen |
| 2003/0182022 A1 | 9/2003 | Addink et al. |
| 2004/0015270 A1 | 1/2004 | Addink et al. |
| 2005/0116671 A1 | 6/2005 | Minami et al. |
| 2005/0192710 A1 | 9/2005 | Thornton et al. |
| 2005/0211793 A1 | 9/2005 | Clark et al. |
| 2005/0216128 A1 | 9/2005 | Clark et al. |
| 2005/0216129 A1 | 9/2005 | Clark et al. |
| 2006/0032938 A1 | 2/2006 | Pomey |
| 2006/0065597 A1 | 3/2006 | Kunczynski |
| 2008/0185914 A1* | 8/2008 | Randall .................... H02J 9/061 |
| | | 307/64 |
| 2010/0013428 A1 | 1/2010 | Shin |
| 2010/0019574 A1* | 1/2010 | Baldassarre ............... H02J 3/14 |
| | | 307/23 |
| 2011/0087379 A1 | 4/2011 | Savelle, Jr. et al. |
| 2011/0210187 A1 | 9/2011 | Noble et al. |
| 2012/0083929 A1 | 4/2012 | Conrad, Jr. |
| 2012/0326649 A1 | 12/2012 | Patanaik et al. |
| 2013/0035802 A1* | 2/2013 | Khaitan .................... H02J 3/386 |
| | | 700/297 |
| 2013/0074827 A1 | 3/2013 | Kim et al. |
| 2013/0079942 A1* | 3/2013 | Smola ....................... H02J 3/14 |
| | | 700/292 |
| 2013/0307339 A1* | 11/2013 | Subramanium ..... H02M 1/4225 |
| | | 307/66 |
| 2014/0111006 A1* | 4/2014 | Baldassarre ............. H02J 9/002 |
| | | 307/23 |
| 2014/0238467 A1 | 8/2014 | Martin et al. |
| 2014/0360556 A1 | 12/2014 | Koppikar et al. |
| 2015/0008737 A1 | 1/2015 | Mao |
| 2015/0028729 A1 | 1/2015 | Frattaruolo et al. |
| 2015/0064022 A1 | 3/2015 | Cobo |
| 2015/0093255 A1 | 4/2015 | Syed et al. |
| 2015/0115714 A1 | 4/2015 | Ferrarons |
| 2015/0188415 A1 | 7/2015 | Abido et al. |
| 2015/0273975 A1 | 10/2015 | Kim |
| 2015/0359185 A1 | 12/2015 | Guy |
| 2016/0059148 A1 | 3/2016 | Alkhazraji |
| 2016/0060136 A1 | 3/2016 | Alkhazraji |
| 2016/0164298 A1 | 6/2016 | Baba |
| 2016/0169239 A1 | 6/2016 | Mortensen et al. |
| 2016/0172861 A1 | 6/2016 | Baba |
| 2016/0181809 A1 | 6/2016 | Chiang et al. |
| 2016/0170427 A1 | 7/2016 | Baba |
| 2016/0211676 A1* | 7/2016 | Chiang ..................... H02J 3/14 |
| 2016/0329719 A1 | 11/2016 | Meyer et al. |
| 2016/0366843 A1 | 12/2016 | Evans |
| 2017/0018933 A1 | 1/2017 | Abido et al. |
| 2017/0047741 A1 | 2/2017 | Narla |
| 2017/0052078 A1 | 2/2017 | Zhao |
| 2017/0238482 A1 | 8/2017 | Abu Al-Rubb |
| 2017/0338657 A1 | 11/2017 | Li et al. |
| 2017/0370250 A1* | 12/2017 | Zeng ..................... H02S 10/10 |
| 2018/0102728 A1* | 4/2018 | Mishra .................... H02J 3/383 |

FOREIGN PATENT DOCUMENTS

| | | |
|---|---|---|
| DE | 102011051507 A1 | 10/2012 |
| EP | 0202847 A2 | 11/1986 |
| EP | 2232984 A1 | 9/2010 |
| EP | 2830170 A1 | 1/2015 |
| EP | 2946656 A1 | 11/2015 |
| IN | 181269 A | 5/1998 |
| IN | 183011 A | 8/1999 |
| IN | 01121MU2002 | 1/2005 |
| IN | 01175MU2007 A | 11/2007 |
| IN | 01456CH2009 A | 9/2009 |
| IN | 219736 | 5/2010 |
| IN | 219739 | 5/2010 |
| IN | 219741 S | 5/2010 |

(56) References Cited

FOREIGN PATENT DOCUMENTS

| | | |
|---|---|---|
| IN | 219738 S | 6/2010 |
| IN | 219737 S | 7/2010 |
| IN | 219740 S | 7/2010 |
| IN | 01167MU2009 A | 11/2010 |
| IN | 01559MU2009 A | 1/2012 |
| IN | 00579CH2012 A | 8/2012 |
| IN | 00074CH2011 A | 10/2012 |
| IN | 254391 B | 11/2012 |
| IN | 00579CH2012 A | 8/2013 |
| IN | 04112MU2013 A | 1/2014 |
| IN | 05797CH2013 A | 1/2014 |
| IN | 00479CH2012 A | 9/2014 |
| IN | 02721MU2014 A | 9/2014 |
| IN | 01626DE2013 A | 12/2014 |
| IN | 00165DE2012 A | 6/2015 |
| IN | 00561KO2015 A | 6/2015 |
| IN | 00214MU2014 A | 8/2015 |
| IN | 01145MU2014 A | 11/2015 |
| IN | 01146MU2014 A | 11/2015 |
| IN | 02235MU2014 A | 4/2016 |
| IN | 03675CH2012 A | 4/2016 |
| IN | 278873 | 5/2016 |
| IN | 278873 S | 5/2016 |
| IN | 201621018390 A | 6/2016 |
| IN | 00177KO2015 A | 8/2016 |
| IN | 00901MU2015 A | 9/2016 |
| IN | 02057CH2015 A | 10/2016 |
| IN | 201631029624 A | 10/2016 |
| IN | 01252DE2015 A | 11/2016 |
| IN | 02178CH2015 A | 11/2016 |
| IN | 02949CH2015 A | 12/2016 |
| IN | 201631010967 A | 12/2016 |
| IN | 02178DE2015 A | 2/2017 |
| WO | WO-1985-05656 | 12/1985 |
| WO | WO-1996-29244 | 9/1996 |
| WO | WO-1999-08506 | 2/1999 |
| WO | WO-2003-022365 A1 | 3/2003 |
| WO | WO-2003-037071 A1 | 5/2003 |
| WO | WO-2004-093526 A1 | 11/2004 |
| WO | WO-2010-066178 A1 | 6/2010 |
| WO | WO-2011-047828 A1 | 4/2011 |
| WO | WO-2012-143003 A2 | 10/2012 |
| WO | WO-2012-143566 A2 | 10/2012 |
| WO | WO-2012-171014 A2 | 12/2012 |
| WO | WO-2013-128049 A1 | 9/2013 |
| WO | WO-2014-131365 A1 | 9/2014 |
| WO | WO-2015-035468 A1 | 3/2015 |
| WO | WO-2015-046231 A1 | 4/2015 |
| WO | WO-2015-060370 A1 | 4/2015 |
| WO | WO-2015-124810 A1 | 8/2015 |
| WO | WO-2015-199629 A1 | 12/2015 |
| WO | WO-2016-004058 A1 | 1/2016 |
| WO | WO-2016-174576 | 11/2016 |

\* cited by examiner

SOLAR POWER SYSTEM

This application claims priority, under 35 U.S.C. § 119(e) to U.S. Provisional Application No. 62/770,256, titled "Solar Power System," filed Nov. 21, 2018, which is incorporated by reference in its entirety.

TECHNICAL FIELD

This application relates to a solar power system and method of operation.

BACKGROUND

This section provides background information related to the present disclosure which is not necessarily prior art.

Referring to FIG. 1, a typical solar power system 10 includes a solar array 12 (e.g., one or more photovoltaic panels) electrically coupled to an AC electrical power grid 18 via a grid tie inverter 14 and an electrical meter 16. The inverter 14 converts DC power from the solar array 12 into AC power and sells the AC power to the grid 18, which is monitored using the meter 16. The AC electrical power grid 18 is electrically coupled to a first load 20 (e.g., a DC powered pump) via a first load controller 22 (e.g., a pump controller) and a first load electrical meter 24 that are configured to control and monitor power delivery from the AC grid 18 to the first load 20. In the illustrated example, the first load controller 22 includes a rectifier that converts AC power from the grid 18 to DC power and circuitry that controls delivery of DC power to a motor of the pump 20. The AC electrical power grid 18 is also electrically coupled to a second load 26 (e.g., a battery) via a second load controller 28 (e.g., a battery charger) and a second load electrical meter 30. In the illustrated example, the second load controller 28 includes a rectifier that converts AC power from the grid 18 to DC power and circuitry that controls charging of the battery 26.

The system 10 depends on the AC power grid 18 being operational in order to provide power to the loads 20, 26. It would be desirable to have a system that can power the loads even when the AC power grid is not operational or available. The system 10 also includes a dedicated controller 22, 28 for each load 20, 26 to individually control power delivery to each load 20, 26 without regard to allocating power among the loads. This works because the loads are powered by the AC grid, which provides essentially unlimited power so that all of the loads can be powered at their full capacity. For a system that powers loads when the AC grid is not operational or available, it would be desirable to be able to allocate limited power from the solar array to the loads according to priority.

SUMMARY

In an aspect, a solar power system includes a solar array, a plurality of loads electrically coupled in parallel to the solar array, and a control circuit electrically coupled to the solar array and in communication with the loads. The control circuit is configured to cause the solar array to operate at a maximum power point (MPP), prioritize power requirements of the loads, and variably allocate power from the solar array among the loads according to the prioritized power requirements of the loads.

Implementations of this aspect may include one or more of the following features. A first one of the loads may be a first DC powered load. A second one of the loads may be a second DC powered load. The control circuit may be configured to assign a priority multiplier to the first and second loads based on power requirements of each of the first and second loads, and may be configured to variably allocate power from the solar array among the first and second loads according the priority multiplier. The first load may be a water pump and the second load may be a battery. The control circuit may be configured to assign a zero multiplier to the battery and a higher multiplier to the pump when 100% of power is required for the pump. The control circuit may be configured to assign a zero multiplier to the pump and a higher multiplier to the battery when no power is required for the pump. The control circuit may be configured to assign a lower multiplier to the battery and a higher multiplier to the pump when power is required for both the pump and the battery and the battery is charged to at least a threshold amount of its capacity. The control circuit may be configured to assign a higher multiplier to the battery and a lower multiplier to the pump when power is required for both the pump and the battery, the battery is charged to less than the threshold amount of its capacity, and the battery priority is higher than the pump. The control circuit may be configured to assign a lower multiplier to the battery and a higher multiplier to the pump when power is required for both the pump and the battery, the battery is charged to less than the threshold amount of its capacity, and the battery priority is lower than the pump. A first DC/DC converter may electrically couple the first load to the solar array and a second DC/DC converter may electrically couple the second load to the solar array.

A second one of the loads is an AC electrical power grid. The control circuit may be configured to assign a priority multiplier to the first and second loads based on the power requirement of the first DC powered load and price of power on the AC electrical power grid, and may be configured to variably allocate power from the solar array among the first and second loads according the priority multiplier. The first load may be one of a water pump and a battery. The control circuit may be configured to assign a zero multiplier to the AC electrical power grid and a higher multiplier to the first DC powered load when 100% of power is required for the first DC powered load. The control circuit may be configured to assign a zero multiplier to the first DC powered load and a higher multiplier to the AC electrical power grid when no power is required for the first DC powered load. The control circuit may be configured to assign a lower multiplier to the DC powered load and a higher multiplier to the AC electrical power grid when a first threshold value corresponding an amount of power required by the DC powered load is lower than a second threshold value corresponding to a price of power on the AC electrical power grid. The control circuit may be configured to assign a lower multiplier to the DC powered load and a higher multiplier to the AC electrical power grid when a first threshold value corresponding an amount of power required by the DC powered load is greater than a second threshold value corresponding to a price of power on the AC electrical power grid. The control circuit may be configured to assign a first multiplier to the DC powered load and a second multiplier to the AC electrical power grid, wherein the first and second multipliers are assigned according to a mathematical relationship between an amount of power required by the DC powered load and a price of power on the AC power grid. A DC/DC converter may electrically couple the solar array to the DC powered load and an inverter circuit may electrically couple the solar array to the AC electrical power grid.

A third one of the loads may be an AC electrical power grid. The control circuit may include a controller and at least one of a DC/DC converter and an inverter electrically coupling the solar array to the loads. One or more communications modules may be configured to communicate operational parameters among the controller, the at least one of a DC/DC converter and the inverter, and the loads.

The control circuit may include a controller configured to perform maximum power point tracking (MPPT) in order to cause the solar array to operate at least at 90% of maximum peak power by implementing a power division MPPT algorithm that performs MPPT in accordance with the prioritized power requirements of each of the loads. The controller may be configured to implement the power division MPPT algorithm by: (a) setting an initial amount of current to be drawn by the each of the loads; (b) drawing a total of the initial current for each load from the solar array; (c) sensing a voltage of the solar array when the total current is drawn from the solar array; (d) calculating a total power drawn from the solar array as a product of the total current and the voltage; (e) increasing, in a stepwise manner, the amount of current drawn by each load until the total power drawn from the solar array is less than an immediately preceding total power drawn by the solar array; and (f) decreasing, in a stepwise manner, the amount of current drawn by each load until the total power drawn from the solar array is less than an immediately preceding total power drawn by the solar array.

The control circuit may be configured to assign a priority multiplier to each of the loads based on the prioritized power requirements of each of the loads and to set the initial amount of current to be drawn by each of the loads proportional to the priority multipliers for each of the loads. Increasing, in a stepwise, manner the amount of current drawn by each load may include increasing the current for each load as a function of the initial current and the priority multiplier for each load. The amount of stepwise current increase for each load may be determined by the equation $$I_{step} = x * z * (y_n / y_{total}) * I_n$$

where $I_{step}$ is the amount of current increase, x is an MPPT slope, z is a ratio balance slope, $y_n$ is the priority multiplier for the load, $y_{total}$ is the sum of the priority multipliers for all of the loads, and $I_n$ is the initial current for the load.

Decreasing, in a stepwise, manner the amount of current drawn by each load may include decreasing the current for each load as a function of the initial current and the priority multiplier for each load. The amount of stepwise current decrease for each load may be determined by the equation $$I_{step} = x * z * (y_n / y_{total}) * I_n$$

where $I_{step}$ is the amount of current increase, x is a MPPT slope, z is a ratio balance slope, $y_n$ is the priority multiplier for the load, $y_{total}$ is the sum of the priority multipliers for all of the loads, and $I_n$ is the initial current for the load.

In another aspect, a method of controlling distribution of power from a solar array to a plurality of loads electrically connected in parallel to the solar array includes: causing the solar array to operate at a maximum power point (MPP); prioritizing power requirements of each of the plurality of loads; and variably allocating power from the solar array among the loads according to the prioritized power requirements of the loads.

Implementations of this aspect may include one or more of the following features. Variably allocating power may include providing DC power to a first one of the loads and/or providing DC power to a second one of the loads. Variably allocating power may include assigning a priority multiplier to the first and second loads based on power requirements of each of the first and second loads, and variably allocating power from the solar array among the first and second loads according the priority multiplier. Assigning a priority multiplier may include assigning a zero multiplier to the first load and a higher multiplier to the second load when 100% of power is required for the second load. Assigning a priority multiplier may include assigning a zero multiplier to the second load and a higher multiplier to the first load when no power is required for the second load.

The second load may include a battery, and assigning a priority multiplier may include assigning a lower multiplier to the first load and a higher multiplier to the battery when power is required for both the first load and the battery and the battery is charged to less than a threshold amount of its capacity. Assigning a priority multiplier may include assigning a higher multiplier to the first load and a lower multiplier to the battery when power is required for both the first load and the battery and the battery is charged to at least the threshold amount of its capacity. The first load may include a pump, and assigning a priority multiplier may include assigning a lower multiplier to the battery and a higher multiplier to the first load when power is required for both the first load and the battery, the battery is charged to less than the threshold amount of its capacity, and the battery priority is lower than the pump.

A second one of the loads may be an AC electrical power grid and variably allocating power may include providing AC power to the AC electrical power grid. Assigning a priority multiplier may include assigning a priority multiplier to the first and second loads based on the power requirement of the first DC powered load and price of power on the AC electrical power grid, and variably allocating power from the solar array among the first and second loads according the priority multiplier. Assigning a priority multiplier may include assigning a zero multiplier to the AC electrical power grid and a higher multiplier to the first DC powered load when 100% of power is required for the first DC powered load. Assigning a priority multiplier may include assigning a zero multiplier to the first DC powered load and a higher multiplier to the AC electrical power grid when no power is required for the first DC powered load. Assigning a priority multiplier may include assigning a lower multiplier to the DC powered load and a higher multiplier to the AC electrical power grid when a first threshold value corresponding an amount of power required by the DC powered load is lower than a second threshold value corresponding to a price of power on the AC electrical power grid. Assigning a priority multiplier may include assigning a lower multiplier to the DC powered load and a higher multiplier to the AC electrical power grid when a first threshold value corresponding an amount of power required by the DC powered load is greater than a second threshold value corresponding to a price of power on the AC electrical power grid. Assigning a priority multiplier may include assigning a first multiplier to the DC powered load and a second multiplier to the AC electrical power grid, wherein the first and second multipliers are assigned according to a mathematical relationship between an amount of power required by the DC powered load and a price of power on the AC power grid. Variably allocating power may include providing AC power to a third one of the loads that is an AC electrical power grid. The method may include communicating, via a communications module, one or more operational parameters among the controller and the loads.

The solar array may be caused to operate at least at 90% of maximum peak power by implementing a power division maximum power point tracking (MPPT) algorithm that performs MPPT in accordance with the prioritized power requirements of each of the loads. The power division MPPT algorithm may include: (a) setting an initial amount of current to be drawn by the each of the loads; (b) drawing a total of the initial current for each load from the solar array; (c) sensing a voltage of the solar array when the total current is drawn from the solar array; (d) calculating a total power drawn from the solar array as a product of the total current and the voltage; (e) increasing, in a stepwise manner, the amount of current drawn by each load until the total power drawn from the solar array is less than an immediately preceding total power drawn by the solar array; and (f) decreasing, in a stepwise manner, the amount of current drawn by each load until the total power drawn from the solar array is less than an immediately preceding total power drawn by the solar array. The method may further include assigning a priority multiplier to each of the loads based on the prioritized power requirements of each of the loads and setting the initial amount of current to be drawn by each of the loads proportional to the priority multipliers for each of the loads.

Increasing, in a stepwise manner, the amount of current drawn by each load may include increasing the current for each load as a function of the initial current and the priority multiplier for each load. The amount of stepwise current increase for each load may be determined by the equation $$I_{step} = x * z * (y_n / y_{total}) * I_n$$

where $I_{step}$ is the amount of current increase, x is an MPPT slope, z is a ratio balance slope, $y_n$ is the priority multiplier for the load, $y_{total}$ is the sum of the priority multipliers for all of the loads, and $I_n$ is the initial current for the load.

Decreasing, in a stepwise manner, the amount of current drawn by each load may include decreasing the current for each load as a function of the initial current and the priority multiplier for each load. The amount of stepwise current decrease for each load is determined by the equation $$I_{step} = x * z * (y_n / y_{total}) * I_n$$

where $I_{step}$ is the amount of current increase, x is an MPPT slope, z is a ratio balance slope, $y_n$ is the priority multiplier for the load, $y_{total}$ is the sum of the priority multipliers for all of the loads, and $I_n$ is the initial current for the load.

Advantages may include one or more of the following. The solar power system may be operable to operate to power loads when an AC grid is not available or is not operational. The solar power system may also allocate power among the loads according to a priority of the power requirements of each load. In addition, the solar power system may provide and sell excess power not needed by the loads to the AC grid according to a priority that is based on the power requirements of each load and the price of power on the AC grid. These and other advantages and features will be apparent from the description, the drawings, and the claims.

DETAILED DESCRIPTION

Figure 1:
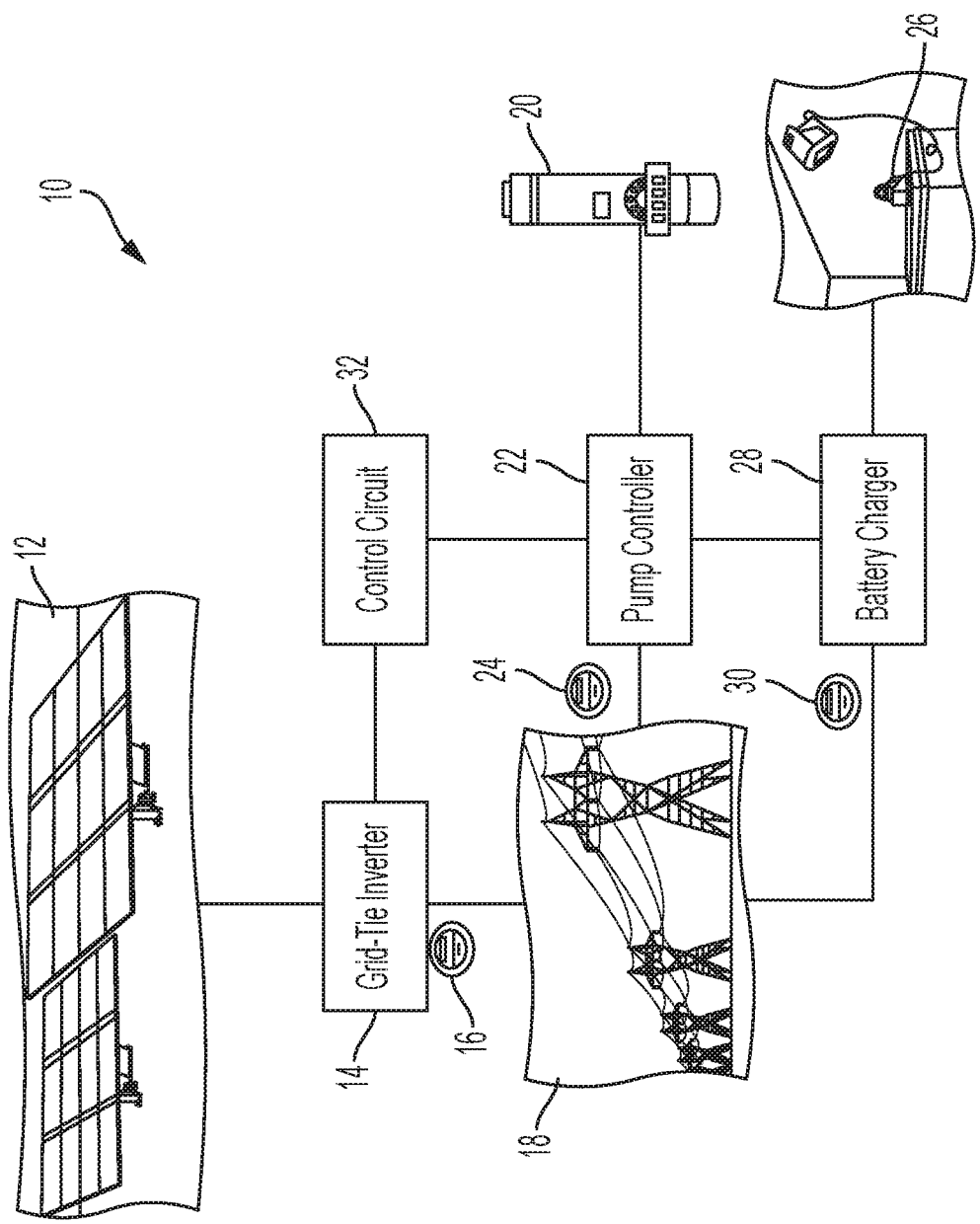
FIG. 1 is schematic diagram of a typical solar power system.
Figure 2:
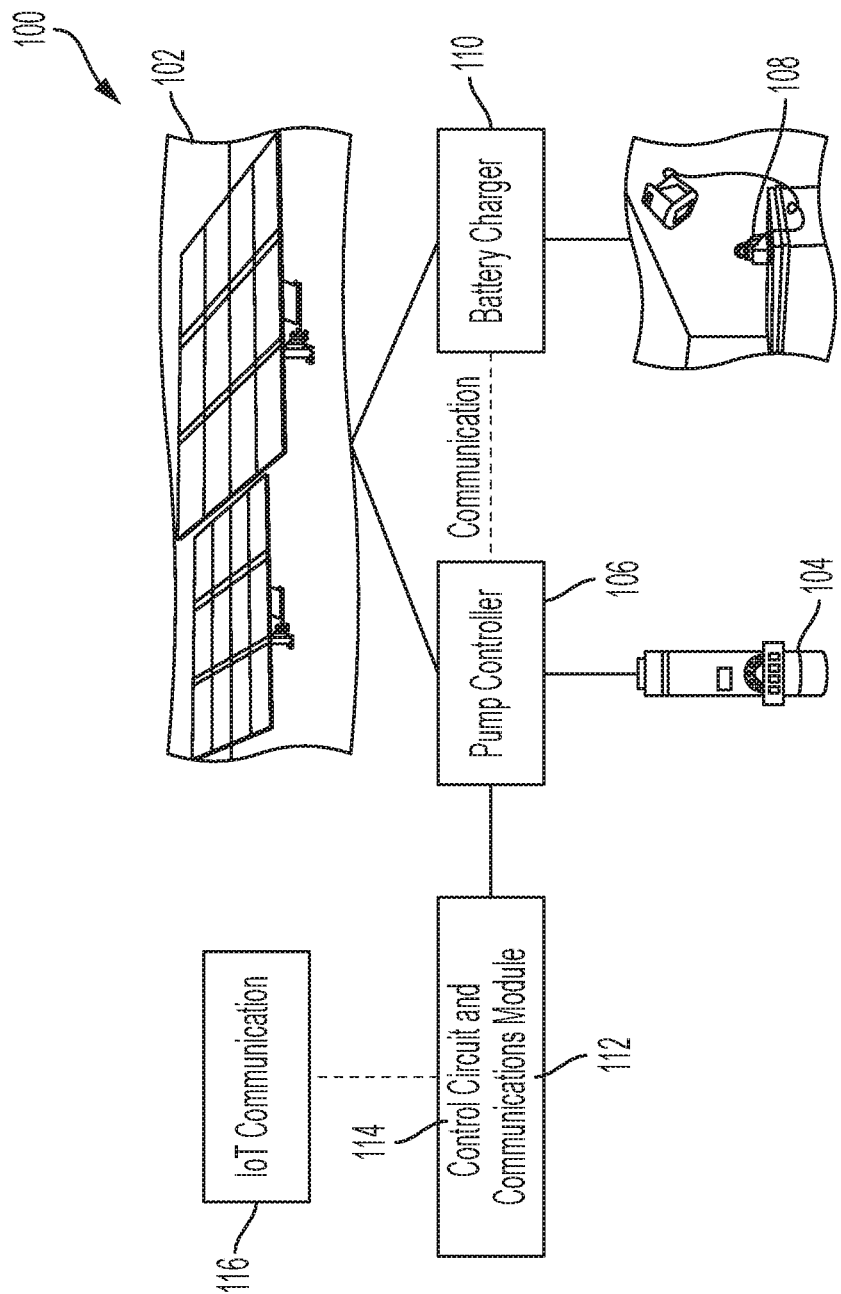
FIG. 2 is a schematic diagram of an embodiment of a solar power system.

Referring to FIG. 2, in an embodiment, a solar power system 100 includes a solar array a solar array 102 (e.g., one or more photovoltaic panels) electrically coupled, in parallel, to a plurality of loads, e.g., a first load 104 and a second load 108. The first load 104 (e.g., a DC powered pump) is electrically coupled to the solar array 102 via a first load controller 106 (e.g., a pump controller) that is configured to control power delivery from the solar array 102 to the first load 104. In the illustrated example, the first load controller 104 includes a DC/DC converter that boosts or reduces the DC voltage from the solar array 102 to a DC voltage that can be applied to the pump 104 and circuitry that controls operation of the pump 104. Alternatively, the first load 104 may be an AC powered pump and the first load controller 106 may include an inverter that converts the DC power from the solar array 102 to AC power for the pump.

The second load 108 (e.g., a battery) is electrically coupled to the solar array 102 in parallel to the first load 104 via a second load controller 110 (e.g., a battery charger). In the illustrated example, the second load controller 108 includes a DC/DC converter that boosts or reduces the DC voltage from the solar array 102 to a DC voltage that can be applied to the charge the battery 108 and circuitry that controls charging of the battery 108.

A central control circuit 114 and a communications module 112 are electrically coupled to the first load controller 106 and the second load controller 108. The control circuit 114 is configured cause the solar array 102 to operate at a maximum power point tracking (MPPT) point, prioritize power requirements of the loads 104, 108, and variably allocate power from the solar array among the loads according to the prioritized power requirements of the loads, as described in greater detail below. The communications module 112 is configured to communicate among the control circuit 114 and the load controllers 106, 110. Optionally, the system 100 may further include an IoT communication module 116 configured to communicate between the control circuit 114 and the internet, the cloud, and other internet-connected devices.

Figure 3:
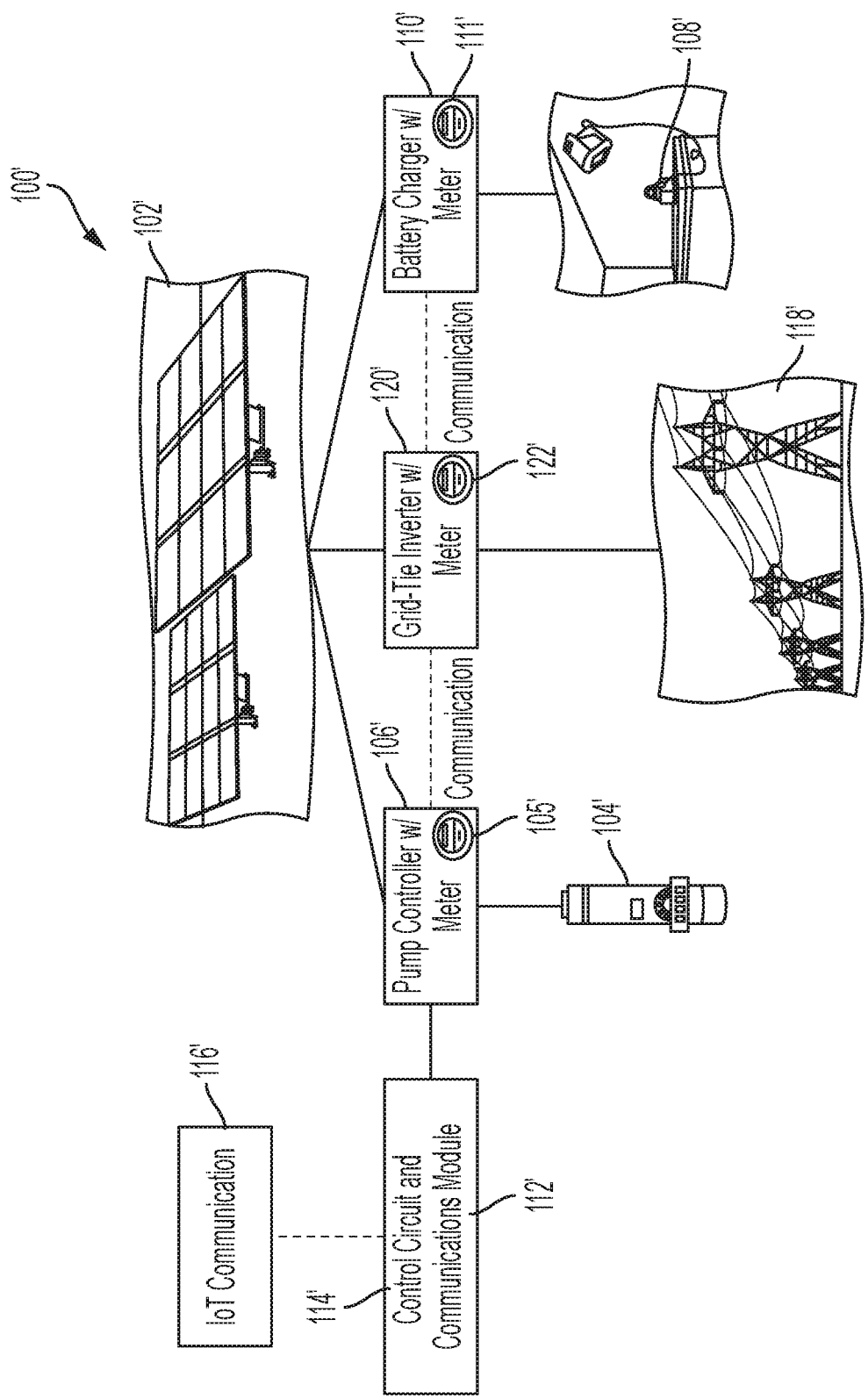
FIG. 3 is a schematic diagram of another embodiment of a solar power system.

Referring to FIG. 3, in another embodiment, a solar power system 100' includes a solar array a solar array 102' (e.g., one or more photovoltaic panels) electrically coupled, in parallel, to a plurality of loads, e.g., a first load 104', a second load 108', and a third load 118'. The first load 104' (e.g., a DC powered pump) is electrically coupled to the solar array 102' via a first load controller 106' (e.g., a pump controller) and a first load electrical meter 105' that are configured to control and monitor power delivery from the solar array 102' to the first load 104'. In the illustrated example, the first load controller 104' includes a DC/DC converter that boosts or reduces the DC voltage from the solar array 102' to a DC voltage that can be applied to the pump 104' and circuitry that controls operation of the pump 104'. Alternatively, the first load 104' may be an AC powered pump and the first load controller 106' may include an inverter that converts the DC power from the solar array 102' to AC power for the pump.

The second load 108' (e.g., a battery) is electrically coupled to the solar array 102' in parallel to the first load 104' via a second load controller 110' (e.g., a battery charger) and a second load electrical meter 111'. In the illustrated example, the second load controller 108' includes a DC/DC converter that boosts or reduces the DC voltage from the solar array 102' to a DC voltage that can be applied to the charge the battery 108' and circuitry that controls charging of the battery 108'.

The third load 118' may be an AC electrical power grid that is electrically coupled to the solar array 102' via a third load controller 120' (e.g., a grid tie inverter) and an electrical meter 122'. The inverter 120' converts DC power from the solar array 102' into AC power and sells the AC power to the grid 118', which is monitored using the meter 122'. The grid tie inverter 120' may also be operable in reverse to draw power from the AC electrical power grid 118' and distribute this power to the first and second loads 104', 108' when power provided by the solar array 102' is unavailable or insufficient to meet the power consumption requirements of the first and second loads 104', 108'.

A central control circuit 114' and a communications module 112' are electrically coupled to the first load controller 106', the second load controller 108', and the third load controller 120'. The control circuit 114' is configured cause the solar array 102' to operate at a maximum power point tracking (MPPT) point, prioritize power requirements of the loads 104', 108', 118' and variably allocate power from the solar array among the loads according to the prioritized power requirements of the loads, as described in greater detail below. The communications module 112' is configured to communicate among the control circuit 114' and the load controllers 106', 110', 120'. Optionally, the system 100' may further include an IoT communication module 116' configured to communicate between the control circuit 114' and the internet, the cloud, and other internet-connected devices.

Referring to FIG. 3, a wide variety of standalone or internet connected devices may be incorporated into the systems 100, 100', either by connecting these devices to the solar array 102, 102' in parallel to the other loads, or may in communication with the IoT communication module 116, 116'.

Figure 4:
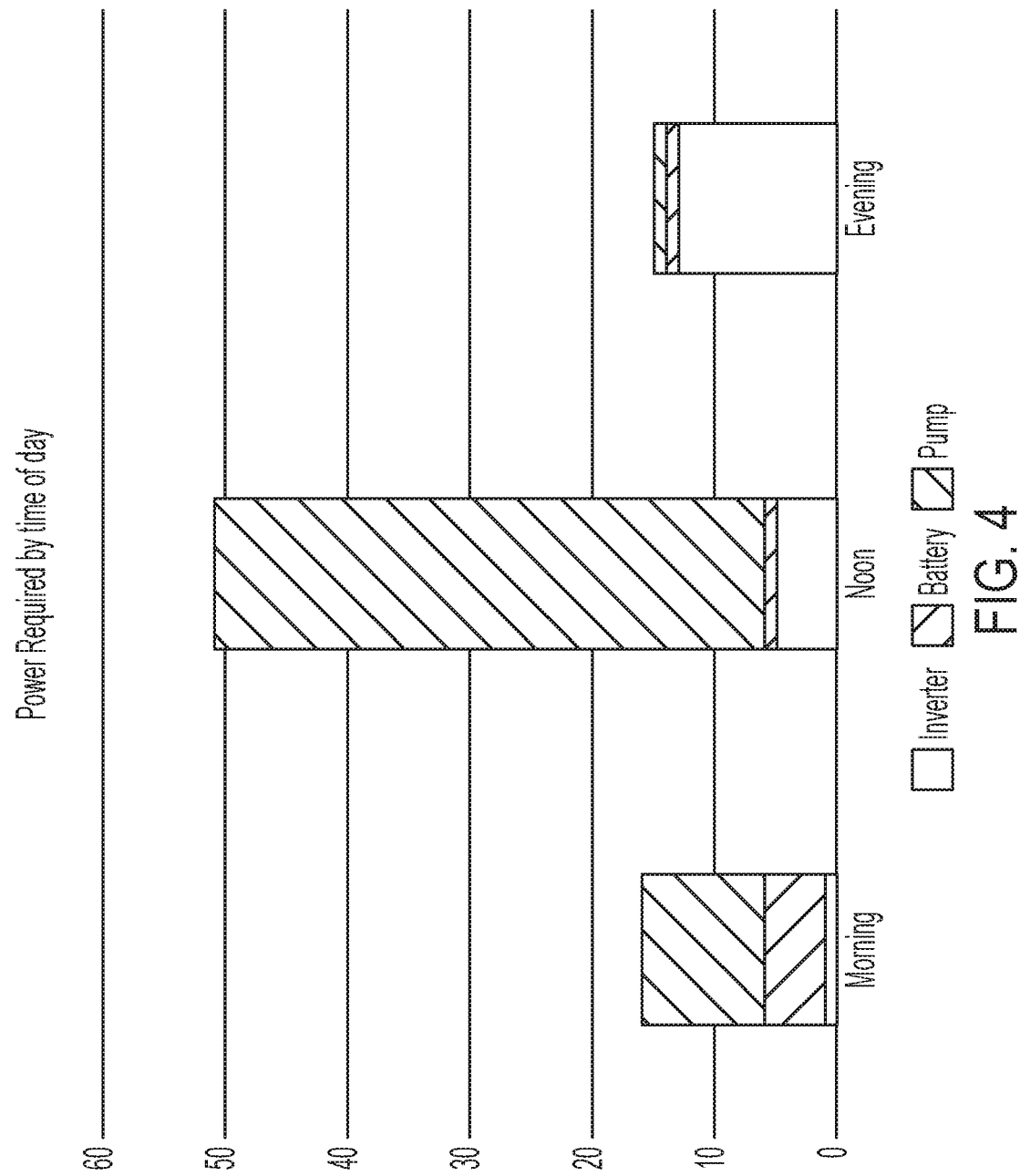
FIG. 4 is a graph illustrating the power requirements of the solar power system of FIG. 3 at different times of day.

Referring to FIG. 4, the relative power requirements of the loads in the system 100 or 100' can vary by the time of day. For example, as shown in FIG. 4, in the system 100', in the morning, the system 100' may have a total power requirement of approximately 15 megawatts, with the pump accounting for approximately 60% of the total, the battery accounting for approximately 30% of the total, and the grid tie inverter accounting for approximately 10% of the total. Around noon, the system 100' may have a total power requirement of approximately 50 megawatts, with the pump accounting for approximately 90% of the total, the battery accounting for approximately 1% of the total, and the grid tie inverter accounting for approximately 9% of the total. In the evening, the system 100' may have a total power requirement of approximately 15 megawatts, with the pump accounting for approximately 5% of the total, the battery accounting for approximately 5% of the total, and the grid tie inverter accounting for approximately 90% of the total. The control circuits 114, 114' of the systems 100, 100' may be configured to assign a priority multiplier to the loads based on power requirements of each of the loads, and to variably allocate power from the solar array among the loads according the priority multipliers.

Figure 5:
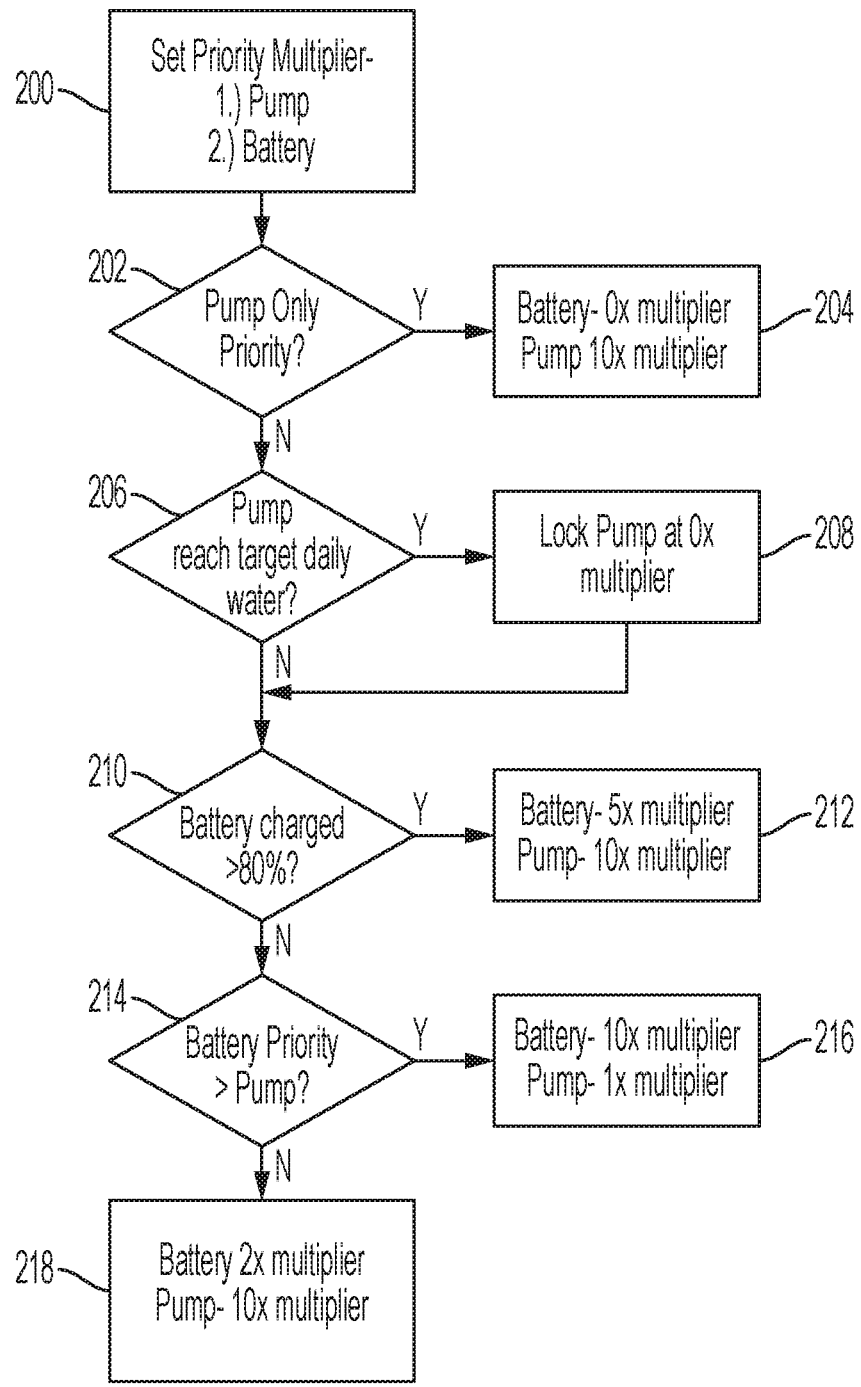
FIG. 5 is a flow chart illustrating an embodiment of a control algorithm and method implemented by the solar power system of FIG. 2.

Referring to FIG. 5, in one exemplary embodiment the control circuit 114 of the two load system 100, without a grid tie inverter and without being connected to the power grid, may be configured to execute a method 200 to assign a priority multiplier to the first load 104 (e.g., the pump) and the second load 108 (e.g., the battery) based on the power requirements of the first and second loads 104, 108, and to variably allocate power from the solar array 102 among the first and second loads 104, 108 according the priority multipliers.

For example, at step 202, the control circuit 114 may determine whether operation of the pump only is a priority (e.g., during a time of day when the total power generated by the solar array is likely to be lower than the power requirements for the pump to pump water for crop irrigation or drinking water). If yes, then at step 204, the control circuit 114 assigns a zero (0×) multiplier for the battery and a higher (10×) multiplier for the pump. This causes, e.g., the battery to draw 0 amps from the solar array 102 and the pump to draw 10 amps from the solar array. Since the voltage from the solar array 102 is the same for each load (since they are connected to the solar array in parallel), this causes 100% of the power generated by the solar array 102 to be distributed to the pump 104. If no, then at step 206, the control circuit 114 determines whether the pump no longer requires any power (e.g., because it has reached its daily target water pumping requirement). If yes, then at step 208, the control circuit 114 assigns a zero (0×) multiplier for the pump and a higher (10×) multiplier for the battery. This causes, e.g., the battery to draw 10 amps from the solar array 102 and the pump to draw 0 amps from the solar array. Since the voltage from the solar array 102 is the same for each load (since they are in parallel), this causes 100% of the power generated by the solar array 102 to be distributed to the battery charger 110 for charging the battery 108.

If the answers at steps 202 and 206 are both no (i.e., the pump requires some but not all of the power generated by the solar array), then, at step 210, the control circuit 114 determines whether the battery 108 has been charged to a capacity above a threshold value (e.g., above 80% of full capacity). If yes, then at step 212, the control circuit 114 assigns a higher multiplier (e.g., 10×) to the pump and a lower multiplier (e.g., 5×) to the battery. This causes, e.g., the battery to draw 10 amps from the solar array 102 and the pump to draw 5 amps from the solar array. Since the voltage from the solar array 102 is the same for each load (since they are in parallel), this causes power to be distributed from the solar array to the pump and the battery in accordance with the relative values of these multipliers (e.g., approximately 67% (10/15) of available power will be delivered to the pump and approximately 33% (5/15) of available power will be delivered to the battery).

If the answer at step 210 is no (i.e., the battery is charged to 80% or less of its capacity), then, at step 214, the control circuit 114 determines whether the battery has a higher priority than the pump (e.g., is it more important to the user to charge the battery or to pump water). If the battery priority is higher than the pump priority, then, at step 216, the control circuit 114 assigns a higher multiplier (e.g., 10×) to the battery and a lower multiplier (e.g., 1×) to the pump. This causes, e.g., the battery to draw 10 amps from the solar array 102 and the pump to draw 1 amp from the solar array. Since the voltage from the solar array 102 is the same for each load (since they are in parallel), this causes power to be distributed from the solar array to the battery and the pump in accordance with the relative values of these multipliers (e.g., approximately 91% (10 amps/11 amps total) of available power will be delivered to the battery and approximately 9% (1 amp/11 amps total) of available power will be delivered to the pump).

If, at step 214, the controller 114 determines that the battery priority is lower than the pump priority, then at step 218, the control circuit 114 assigns a lower multiplier (e.g., 2×) to the battery and a higher multiplier (e.g., 10×) to the pump. This causes, e.g., the battery to draw 2 amps from the solar array 102 and the pump to draw 10 amps from the solar array. Since the voltage from the solar array 102 is the same for each load (since they are in parallel), this causes power to be distributed from the solar array to the battery and the pump in accordance with the relative values of these multipliers (e.g., approximately 17% (2 amps/12 amps total) of available power will be delivered to the battery and approximately 83% (10 amps/12 amps total) of available power will be delivered to the pump). The relative priorities of the pump and the battery may vary by time of day or pumping or battery charging requirements and may be pre-programmed or user adjustable.

Figure 6:
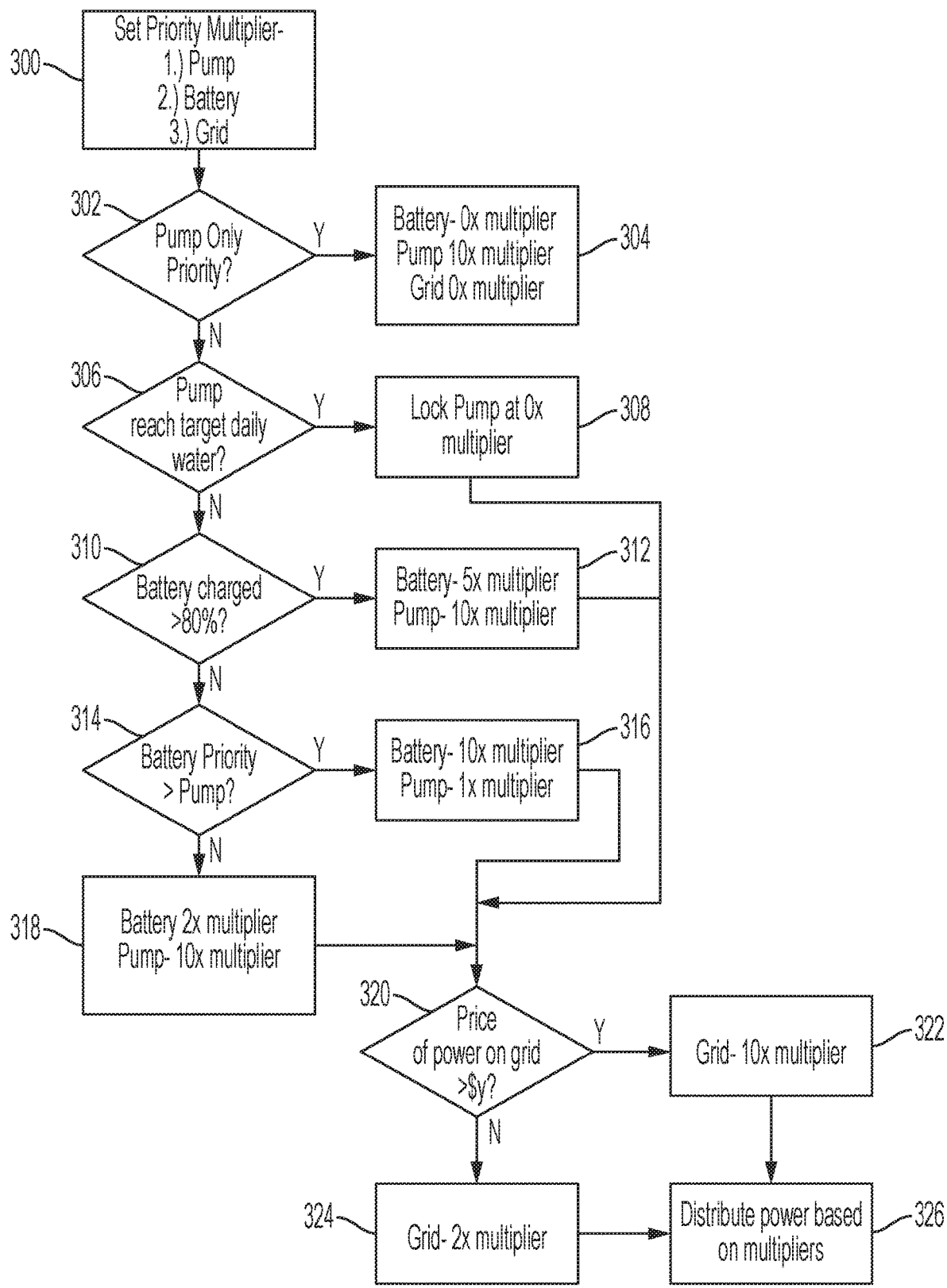
FIG. 6 is a flow chart illustrating an embodiment of a control algorithm and method implemented by the solar power system of FIG. 3.

Referring to FIG. 6, in another exemplary embodiment the control circuit 114' of the three load system 100' that is connected to the AC grid may be configured to execute a method 300 to assign a priority multiplier to the first load 104' (e.g., the pump), the second load 108' (e.g., the battery), and the third load 118' based on the power requirements of the first and second loads 104', 108' and a price of power on the AC power grid 118', and to variably allocate power from the solar array 102' among the first and second loads 104', 108' and the AC power grid 118' according the priority multipliers.

For example, at step 302, the control circuit 114' may determine whether operation of the pump only is a priority (e.g., during a time of day when the total power generated by the solar array is likely to be lower than the power requirements for the pump to pump water for crop irrigation or drinking water). If yes, then at step 304, the control circuit 114' assigns a zero (0×) multiplier for the battery 108' and the AC power grid 118' and a higher (10×) multiplier for the pump. This causes, e.g., the battery and the AC grid each to draw 0 amps from the solar array 102 and the pump to draw 10 amps from the solar array. Since the voltage from the solar array 102 is the same for each load (since they are in parallel), this causes 100% of the power generated by the solar array 102' to be distributed to the pump 104'. If no, then at step 306, the control circuit 114' determines whether the pump no longer requires any power (e.g., because it has reached its daily target water pumping requirement). If yes, then at step 308, the control circuit 114 assigns a zero (0×) multiplier for the pump and a higher multiplier (e.g., 10×) to the battery, and proceeds to step 320, which is discussed below.

If the answers at steps 302 and 306 are both no (i.e., the pump requires some but not all of the power generated by the solar array), then, at step 310, the control circuit 114' determines whether the battery 108' has been charged to a capacity above a threshold value (e.g., above 80% of full capacity). If yes, then at step 312, the control circuit 114' assigns a higher multiplier (e.g., 10×) to the pump and a lower multiplier (e.g., 5×) to the battery and proceeds to step 320, which is discussed below.

If the answer at step 310 is no (i.e., the battery is charged to 80% or less of its capacity), then, at step 314, the control circuit 114' determines whether the battery has a higher priority than the pump (e.g., is it more important to the user to charge the battery or to pump water). If the battery priority is higher than the pump priority, then, at step 316, the control circuit 114' assigns a higher multiplier (e.g., 10×) to the battery and a lower multiplier (e.g., 1×) to the pump, and proceeds to step 320, which is discussed below. If, at step 314, the controller 114' determines that the battery priority is lower than the pump priority, then at step 318, the control circuit 114' assigns a lower multiplier (e.g., 2×) to the battery and a higher multiplier (e.g., 10×) to the pump, and proceeds to step 320, which is discussed below.

At step 320, the controller 114' determines whether the price of power on the AC grid 118' is greater than a threshold value $Y (e.g., $100/MW). If yes, then at step 322, the controller 314' assigns a higher multiplier (e.g., 10×) to the AC power grid 118'. If no, then at step 324, the controller 314' assigns a lower multiplier (e.g., 2×) to the AC power grid 118'.

At step 326, the controller 114' causes power to be distributed to the pump 104', the battery 108', and to the AC power grid 118' in accordance with the relative values of the multipliers that have been assigned to each at steps 304, 308, 312, 316, 318, 322, and 324. For example, if, at step 304, the controller 114' has assigned a 10× multiplier to the pump 104' and 0× multipliers to the battery 108' and the AC power grid 118', then, at step 326, the controller causes, e.g., the battery and the AC power grid to draw 0 amps from the solar array 102 and the pump to draw 10 amps from the solar array. Since the voltage from the solar array 102 is the same for each load (since they are in parallel), this causes 100% of the power generated by the solar array 102 to be distributed to the pump 104'.

In another example, if, at step 312, the controller has assigned a 5× multiplier to the battery 108', a 10× multiplier to the pump 104', and, at step 322 has assigned a 10× multiplier to the AC grid 118', then, at step 326, the controller 114' causes the battery to draw 5 amps, the AC grid to draw 10 amps and the pump to draw 10 amps from the solar array. Since the voltage from the solar array is the same for each load (since they are in parallel), this causes 20% (5 amps/25 amps total) of the power from the solar array to be distributed to the battery 108', 40% (10 amps/25 amps total) to be distributed to the pump 104', and 40% (10 amps/25 amps total) to be distributed to the AC power grid 118'.

In yet another example, if, at step 316, the controller has assigned a 10× multiplier to the battery 108', a 1× multiplier to the pump 104', and, at step 324 has assigned a 2× multiplier to the AC grid 118', then, at step 326, the controller 114' causes the battery to draw 10 amps, the pump to draw 1 amp, and the AC grid to draw 2 amps from the solar array. Since the voltage from the solar array is the same for each load (since they are in parallel), this causes approximately 77% (10 amps/13 amps total) of the power from the solar array to be distributed to the battery 108', approximately 8% (1 amp/13 amps total) to be distributed to the pump 104', and approximately 15% (2 amps/13 amps total)

to be distributed to the AC power grid 118'. Other examples should be readily apparent to those of ordinary skill in the art.

Figure 7:
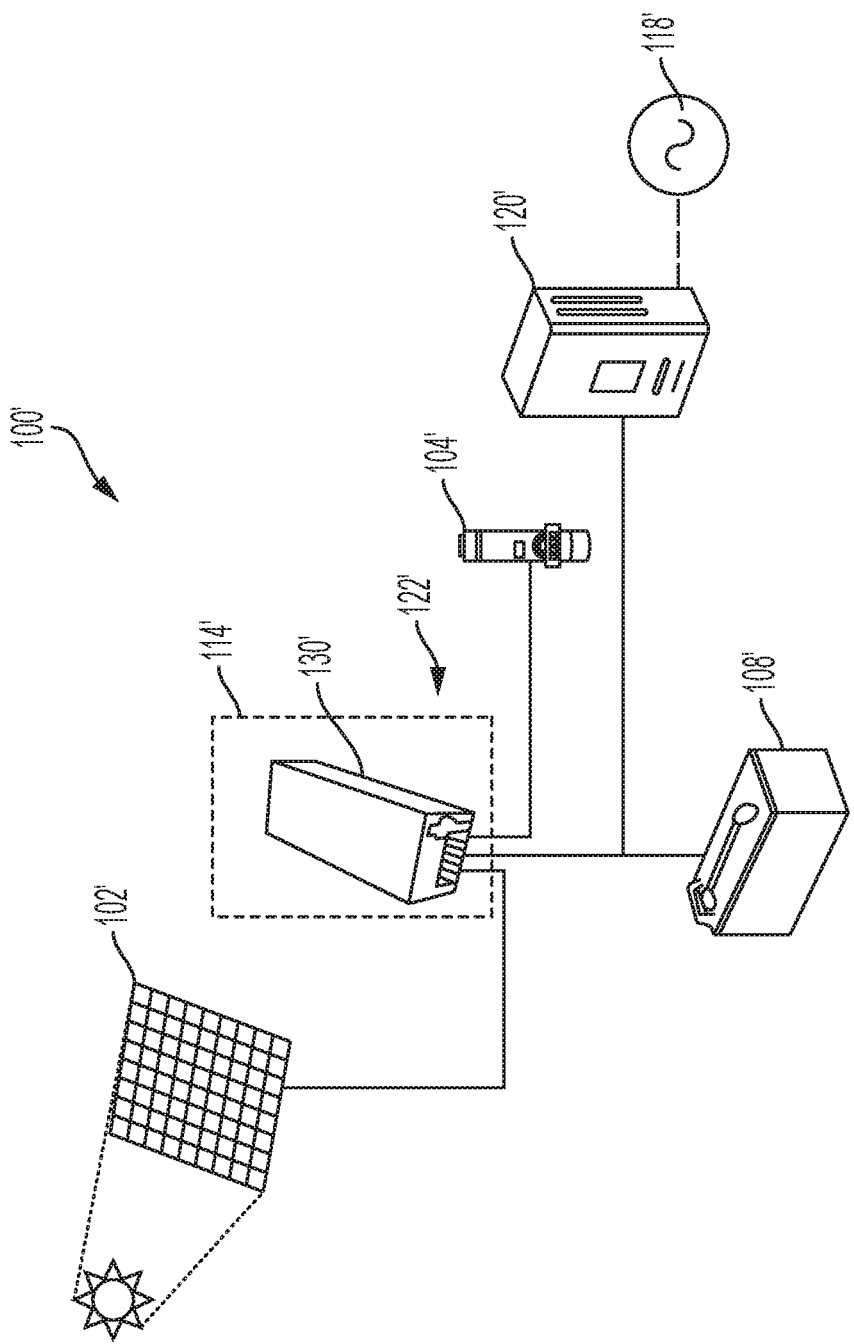
FIG. 7 is a schematic diagram of a MPPT controller that may be part of the control circuit in the solar power systems of FIGS. 2 and 3.

Referring to FIG. 7, in an embodiment, the control circuit 114' in the system 100' (or the controller 114 in the system 100) may include a MPPT charge controller 130' (or an MPPT charge controller 130) that is configured to cause the solar array 102' to operate at the MPPT point by throttling an amount of current drawn by each of the loads (e.g., pump 104', battery 108', and AC electrical grid 118') to determine the MPPT point. The maximum power point may vary with time of day and year, cloud conditions, and temperature. In MPPT or Maximum Power Point Tracking, a control device is programmed and operable to extract a maximum available amount of power from a solar array under certain conditions. The power at which the solar array can produce maximum power is called the "maximum power point" and the voltage at which the solar array operates at the maximum power point is called the "peak power voltage."

Figure 8:
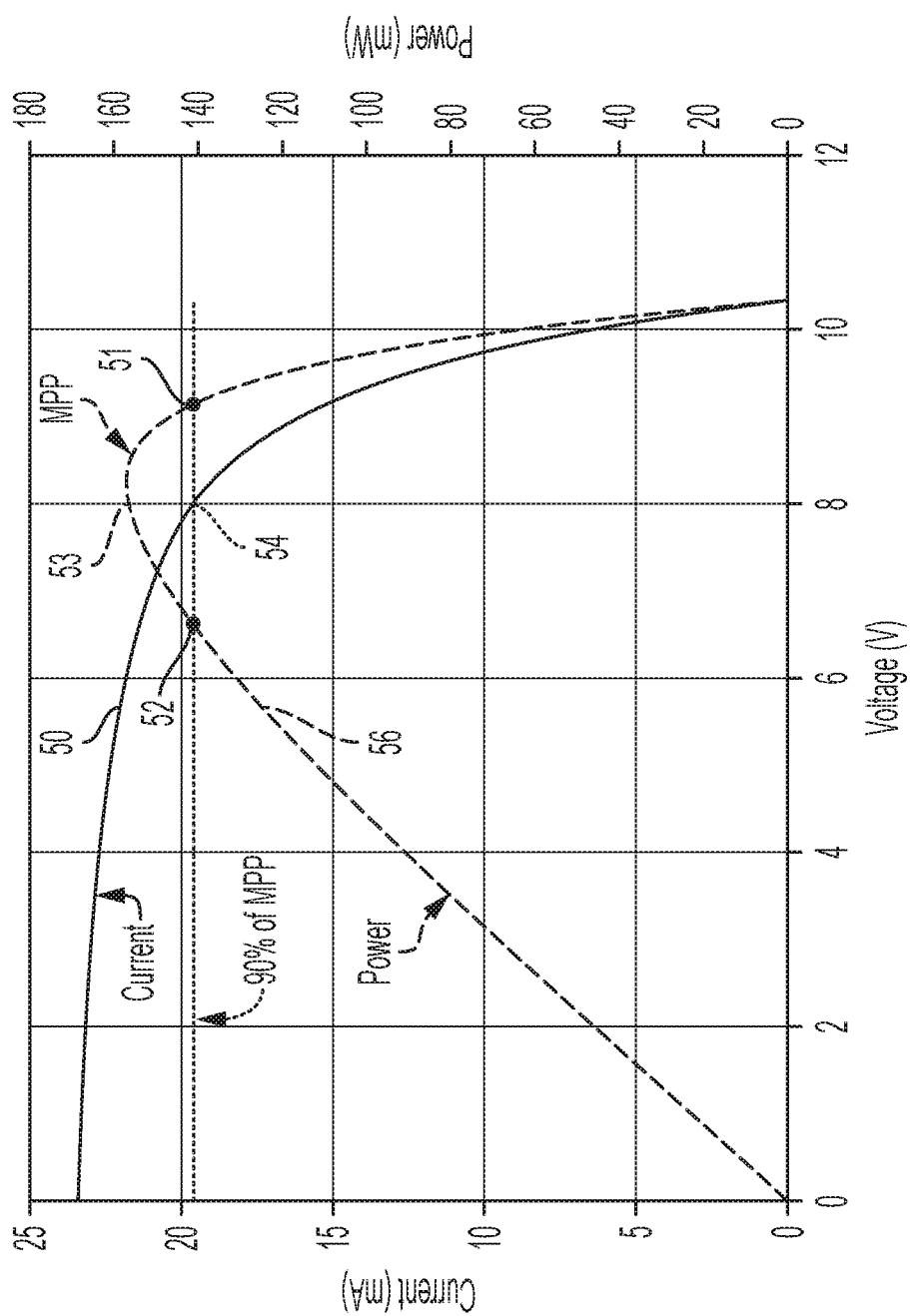
FIG. 8 is a graph illustrating operation of the MPPT controller of FIG. 7.

Referring to FIG. 8, the solar arrays 102, 102' (like all solar arrays) are characterized by a voltage/current curve 50 in which the current is relatively constant as the voltage increases to reach the peak power voltage 54 and then drops off quickly as the voltage increases above the peak power voltage 54. The solar arrays 102, 102' are also characterized by a voltage/power curve that reaches a peak at the maximum power point 53. The goal of MPPT tracking for the solar arrays 102, 102' is to maintain the power between points 51 and 52 on the voltage/power curve so that the output power from the solar arrays 102, 102' is always at least 90% of the maximum peak power 53.

In conventional solar power systems with multiple loads, there may be one MPPT device per load connected to the solar array, or there may be a single MPPT connected to all of the loads that aggregate the demand of the loads. However, if multiple devices are connected in parallel to the solar array, the MPPT device has a tendency to cause the loads to fight each other based on their relative power demands. The systems 100, 100' described above, with multiple loads in parallel, avoid these problems by using the priority multipliers assigned to each load and then implementing power division MPPT, as described below.

Figure 9:
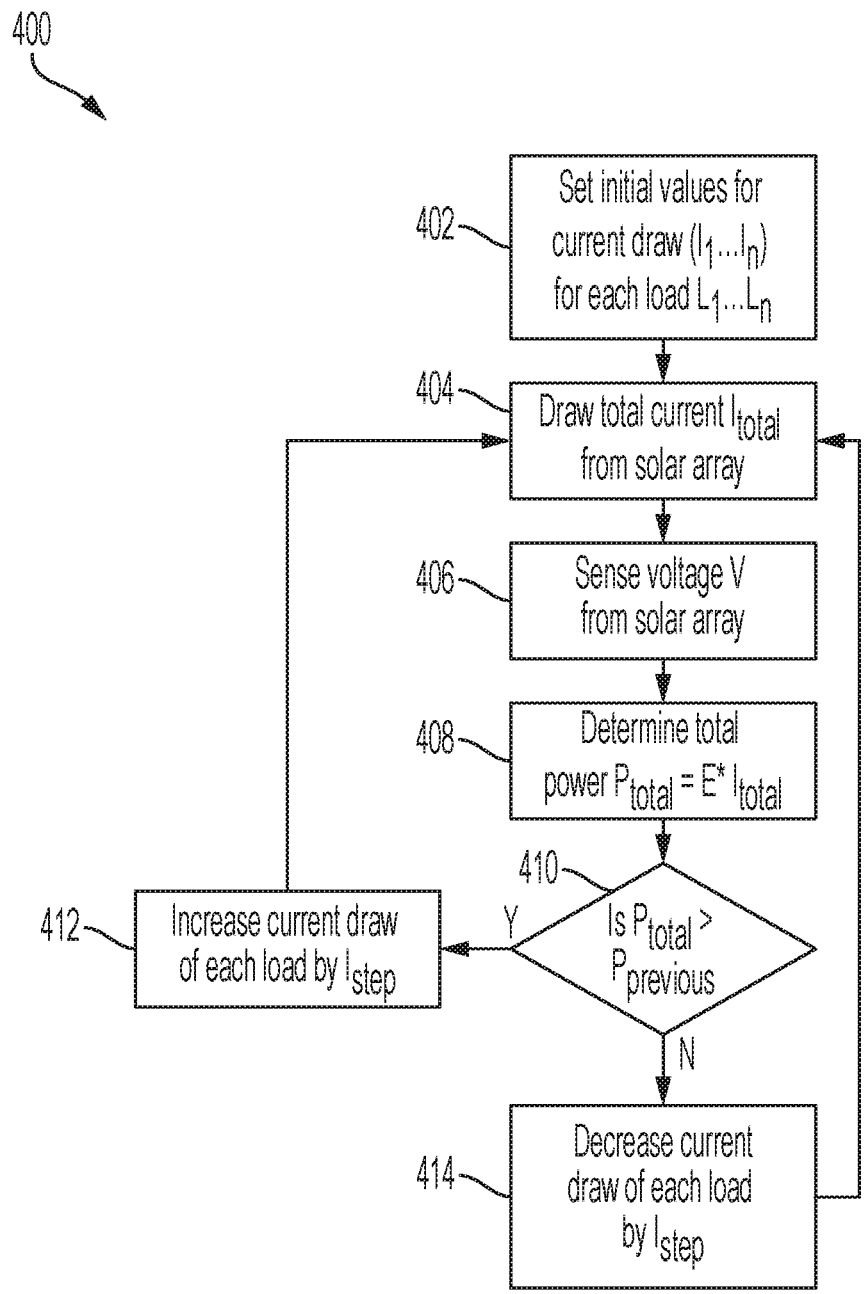
FIG. 9 is a flow chart illustrating a first example of operation of the MPPT controller of FIG. 7.

Referring to FIG. 9, in an embodiment, the MPPT charge controller 130, 130' in the control circuit 114, 114' is configured and programmed to implement the following power division MPPT algorithm 400. First, at step 402, the control circuit 114, 114' sets an initial value for current ($I_1 \ldots I_n$) to be drawn from the solar array for each of the loads ($L_1 \ldots L_n$), according the multipliers assigned to each load, as set forth above. For example, if the control circuit 114, 114' has assigned a 10× multiplier to the battery 108', a 1× multiplier to the pump 104', and, at step 324 has assigned a 2× multiplier to the AC grid 118', then, at step 402, the controller 114' may set initial values of 10 amps for the battery, 1 amp for the pump, and 2 amps for the AC power grid.

Next, at step 404, the control circuit 114, 114' draws the total amount of the current $I_{total}$ assigned to each load from the solar array, which is the sum of each initial current value $I_1 \ldots I_n$. For example, if initial values for current are 10 amps for the battery, 1 amp for the pump, and 2 amps for the AC power grid, the control circuit 114, 114' will draw a total of 13 amps from the solar array. At step 406, the control circuit 114, 114' senses the amount of voltage V from the solar array, and at step 408, calculates the total power $P_{total}$ as the product of the voltage V and total current $I_{total}$. At step 410, the control circuit 114, 114' determines whether the total power $P_{total}$ is greater than the immediately previous value for total power $P_{previous}$. If the answer at step 410 is yes, then, at step 412, the control circuit 114, 114' increases the amount of current drawn by each load by a stepwise amount $I_{step}$ (e.g., by a fixed percentage (such as 1%) or by a fixed amount (such as 0.01 amps)), and then repeats steps 406-412. If the answer at step 410 is no, then, at step 414, the control circuit 114, 114' decreases the amount of current drawn by each load by a stepwise amount $I_{step}$ (e.g., by a fixed percentage (such as 1%) or by a fixed amount (such as 0.01 amps)), and then repeats steps 406-412. Thus, the control circuit 114, 114' increases, in a stepwise manner, the amount of current drawn by each load until the total power is not greater than the immediately previous value for total power, and decreases, in a stepwise manner, the amount of current drawn by each load until the sensed power is greater than the immediately previously sensed power. Using this algorithm, the control circuit 114, 114' maintains the amount of power drawn from the solar array at an amount that is at least equal to 90% of the maximum peak power point for the solar array.

Figure 10:
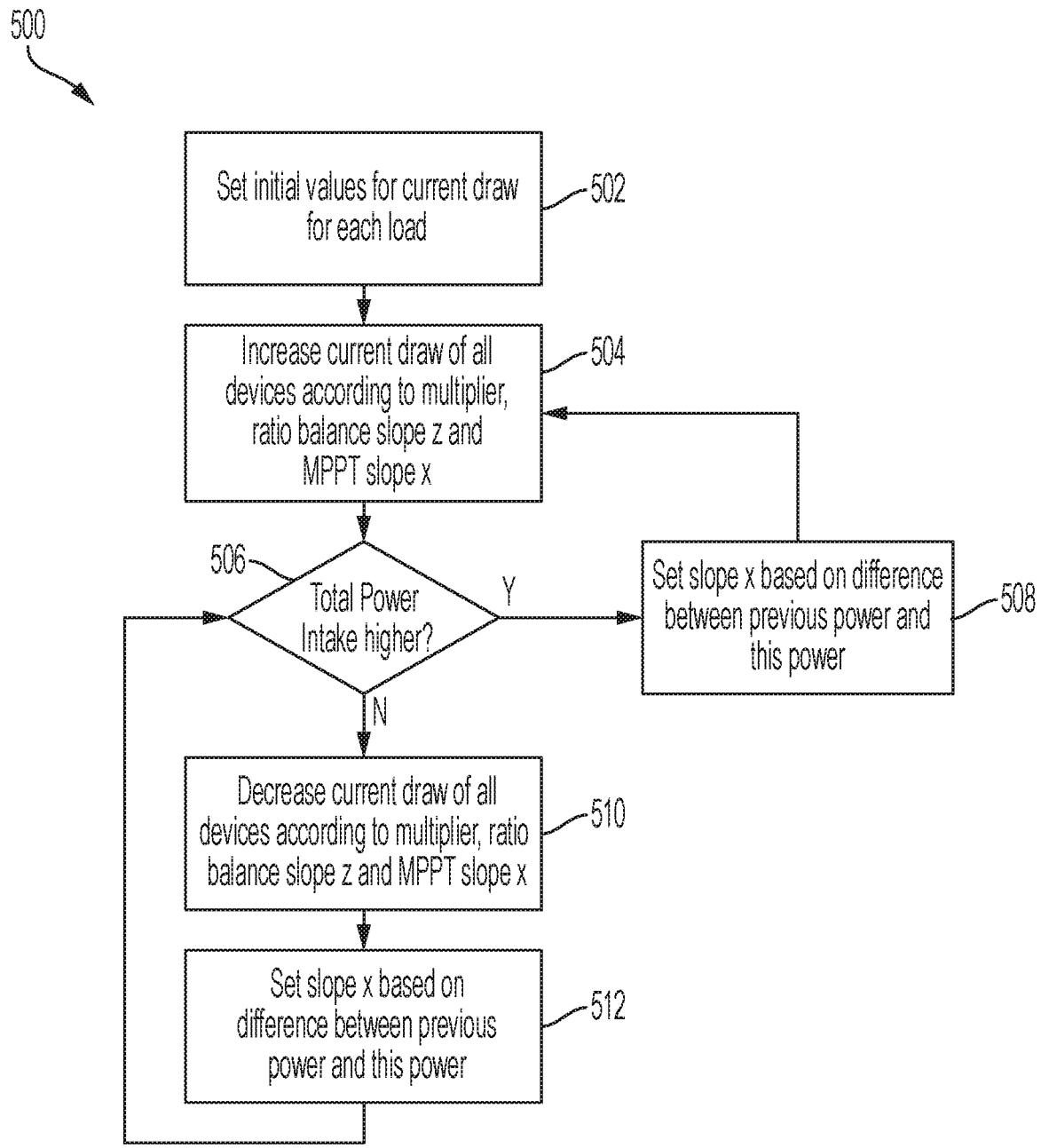
FIG. 10 is a flow chart illustrating a second example of operation of the MPPT controller of FIG. 7.

Referring to FIG. 10, in another embodiment, the MPPT charge controller 130, 130' in the control circuit 114, 114' is configured and programmed to implement a power division MPPT algorithm 500 similar to the power division MPPT algorithm of FIG. 9, except as further described below. First, at step 502, the control circuit 114, 114' sets an initial value for current ($I_1 \ldots I_n$) for each of the loads ($L_1 \ldots L_n$), according multipliers assigned to each load, as set forth above. The controller 114, 114' also causes the loads to draw the total amount of current $I_{total}$ (i.e., the sum of $I_1 \ldots I_n$), senses the voltage V from the solar array, and determines the total power $P_{total}$ being drawn, which is the product of the total current $I_{total}$ and the voltage V (i.e., $P_{total}=I_{total}*V$). Next, at step 504, the control circuit 114, 114' increases the amount of current drawn by each load by a stepwise amount ($I_{step}$) that is a function of the multiplier y for each load, the current ($I_1 \ldots I_n$) for each load, an MPPT slope x, and a ratio balance slope z, according to the following equation.

$$I_{step}=x*z*(y_n/y_{total})*I_n \qquad (1)$$

The ratio balance slope z determines the rate at which a ratio between the multipliers of various loads is adjusted when the multipliers change. For instance, with a very fast slope (i.e., a large value for z), if the system changes from a 10× multiplier for the pump and a 0× multiplier for the charger to a 0× multiplier for the pump and a 10× multiplier for the battery charger, the pump would stop very quickly and the battery charger would start very quickly. With a slower slope (i.e., a small value for z), the pump power would slowly ramp down, and the battery charger power would slowly ramp up to the new multipliers.

MPPT slope x determines the rate at which the MPPT algorithm adjusts itself. For example, if the system notices that it is very far away from the likely maximum power point (MPP), the system may have a faster MPPT slope (i.e., a higher value for x) to more efficiently and quickly increase the power draw from the solar array. Once the system reaches a point where the power draw from the solar array is close to (e.g., with 10%) below or above the maximum power point (MPP), the system could change the a slower MPPT slope (i.e., a lower value for x) in order to maintain the power draw from the solar arrange closer to the maximum peak power point (MPP).

At step 504, the control circuit 114, 114' also draws the new total amount of the current $I_{total}$ assigned to each load from the solar array, senses the amount of voltage V from the solar array, calculates the new total power $P_{total}$ as the product of the voltage V and total current $I_{total}$. At step 506, the control circuit 114, 114' determines whether the new total power $P_{total}$ is greater than the immediately previous total power $P_{previous}$. If the answer at step 506 is yes, then at step 508, the control circuit 114, 114' sets a new value for the MPPT slope x as the difference between the previous total power $P_{previous}$ and the new total power $P_{total}$, and then repeats steps 504 and 506, increasing the amount of current drawn by each load by $I_{step}$. If the answer at step 506 is no, then at step 510, the control circuit 114, 114' decreases the amount of current drawn by each load by a stepwise amount ($I_{step}$) that is a function of the multiplier y for each load, current ($I_1 \ldots I_n$) for each load, the MPPT slope x, and the ratio balance slope z, according to the following equation:

$$I_{step} = -x*z*(y_n/y_{total})*I_n \quad (2)$$

Next, at step 512, the control circuit 114, 114' sets a new value for the MPPT slope x as the difference between the previous total power $P_{previous}$ and the new total power $P_{total}$, and then repeats step 506, decreasing the amount of current drawn by each load by $I_{step}$. Thus, the control circuit 114, 114' increases, in a stepwise manner, the amount of current drawn by each load until the total power is not greater than the immediately previous value for total power, and decreases, in a stepwise manner, the amount of current drawn by each load until the sensed power is greater than the immediately previously sensed power. Using this algorithm, the control circuit 114, 114' maintains the amount of power drawn from the solar array at an amount that is at least equal to 90% of the maximum peak power point for the solar array.

Figure 11A:
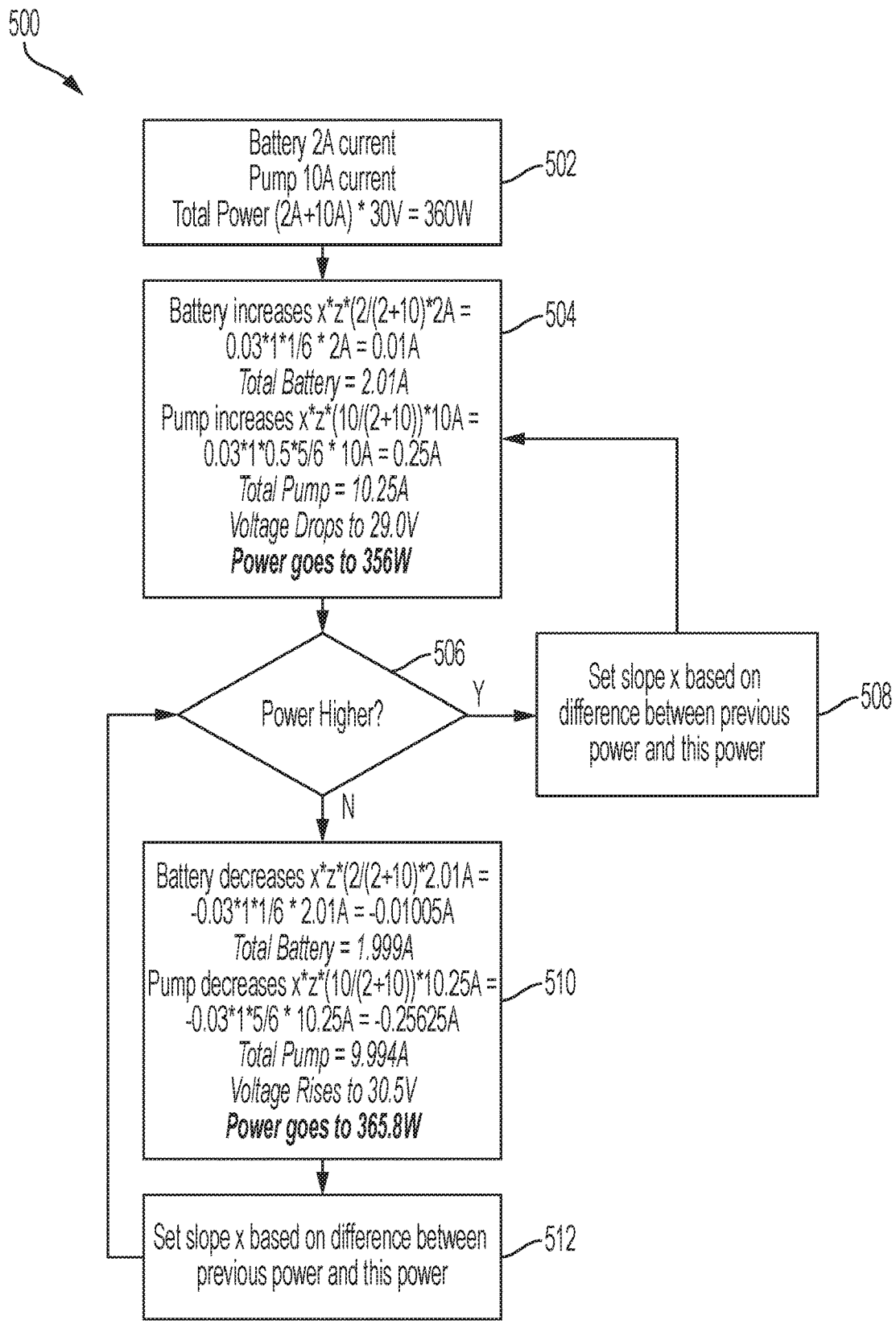
FIG. 11A is a flow chart illustrating a third example of operation of the MPPT controller of FIG. 7.
Figure 11B:
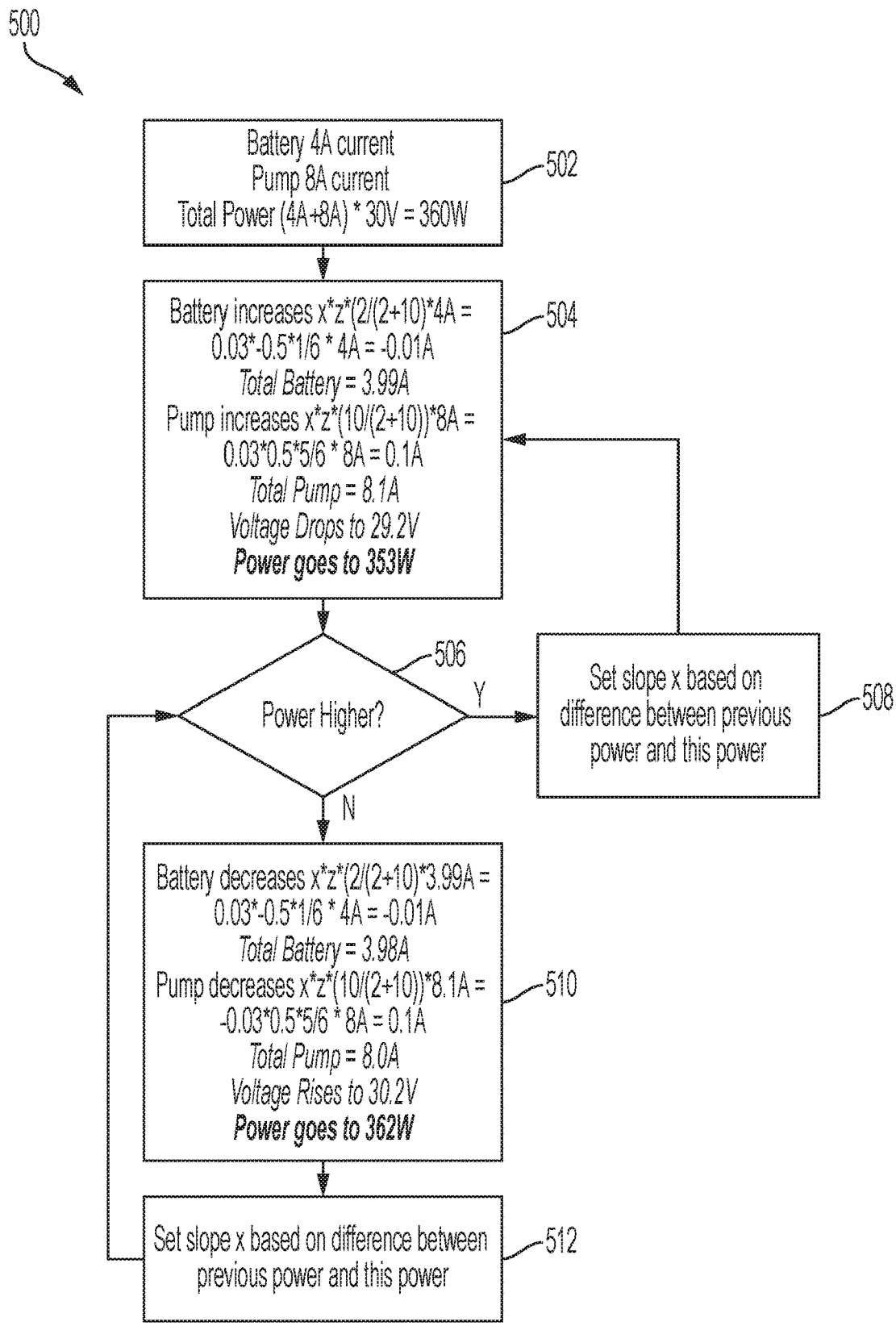
FIG. 11B is a flow chart illustrating a fourth example of operation of the MPPT controller of FIG. 7.
Figure 11C:
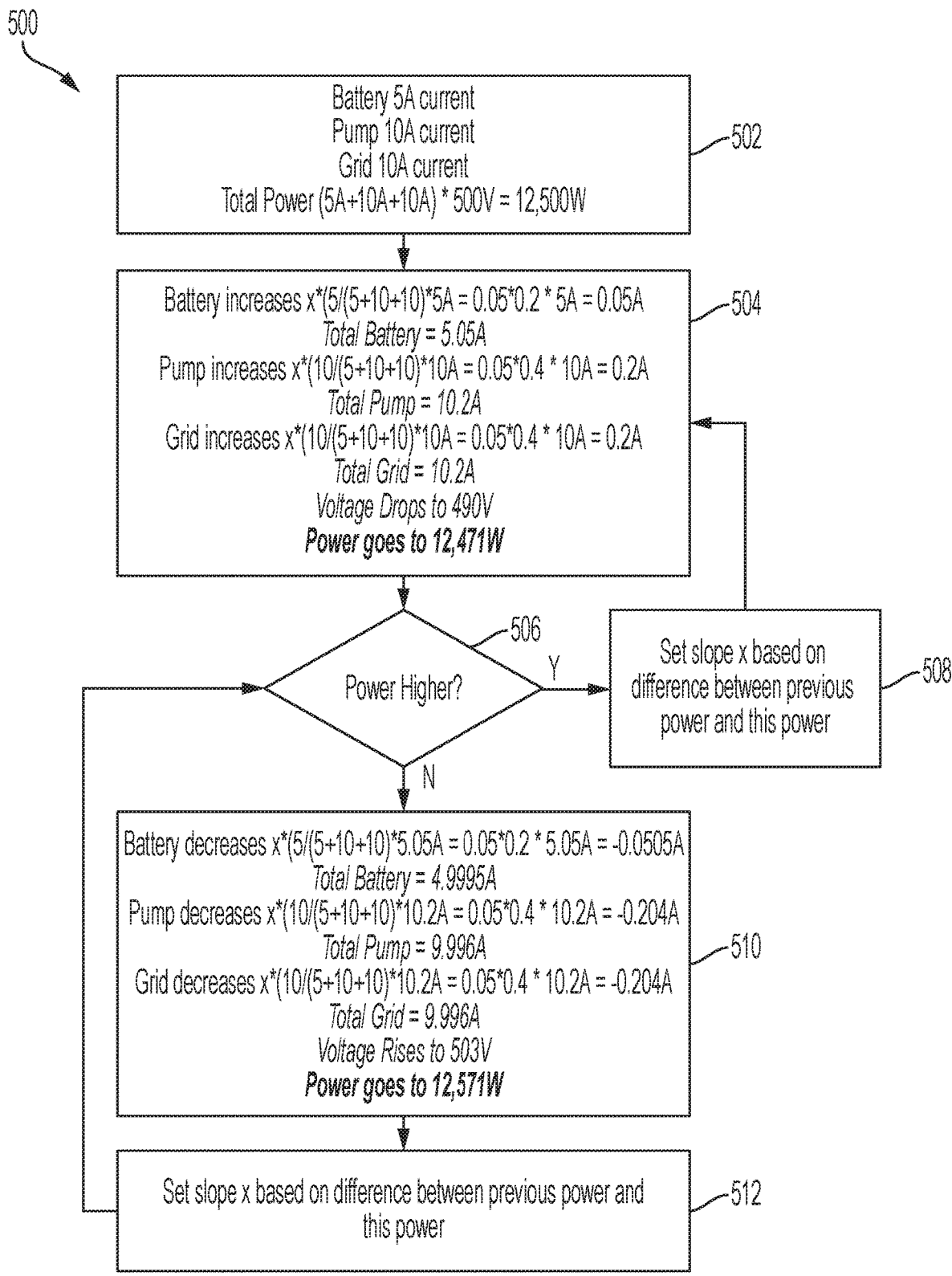
FIG. 11C is a flow chart illustrating a fifth example of operation of the MPPT controller of FIG. 7.

FIGS. 11A-11C are flow charts illustrating three example implementations of the power division algorithm 500 described above and shown in FIG. 10. FIG. 11A illustrates an example implementation of algorithm 500 with two loads coupled to a solar array—a battery that has been assigned a 2× multiplier and a pump that has been assigned a 10× multiplier, and in which the amounts of current being drawn by the battery and the pump are initially balanced as compared to the multipliers (i.e., at step 502, the control circuit 114, 114' sets an initial value of current for the battery, $I_{battery}$=2 A and for the pump $I_{pump}$=10 A, in accordance with the 2× and 10× multipliers assigned to these loads). At step 502, the controller 114, 114' causes the loads to draw the total amount of current $I_{total}$=12 A (i.e., the sum of $I_{battery}+I_{pump}$=2 A+10 A), senses the voltage V=30V from the solar array, and determines the total power $P_{total}$=360 W (i.e., the product of $I_{total}*V$=12 A*30V). Next, at step 504, the control circuit 114, 114' increases the amount of current drawn by each load by a stepwise amount ($I_{step}$) that is a function of the multipliers $y_{battery}$=2× and $y_{pump}$=10× for each load, the current $I_{battery}$, $I_{pump}$ for each load, an MPPT slope x=0.03, and a ratio balance slope z=1, according to equation (1):

$$I_{step-battery}=0.03*1*(2/(2+10))*2 \text{ A}=0.01 \text{ A}$$

$$I_{step-pump}=0.03*1*(10/(2+10))*10 \text{ A}=0.25 \text{ A}$$

Therefore, the new current for the battery equals $I_{battery}+I_{step-battery}$=2 A+0.01 A=2.01 A and the new current for the pump equals $I_{pump}+I_{step-pump}$=10 A+0.25 A=10.25 A. At step 504, the control circuit 114, 114' also draws the new total amount of the current $I_{total}$=2.01 A+10.26 A=12.26 A) assigned to each load from the solar array, senses the amount of voltage V from the solar array, calculates the new total power $P_{total}$ as the product of the voltage V and total current $I_{total}$. In this example, the voltage V drops to 29.0V and the total power $P_{total}$ drops to 356 W (i.e., 12.26 A*29.0V). At step 506, the control circuit 114, 114' determines whether the new total power $P_{total}$ is greater than the immediately previous total power $P_{previous}$. If yes, then the algorithm proceeds to step 508, in which the MPPT slope x is rest based on the difference between the new total power $P_{total}$ and the immediately previous total power $P_{previous}$. If not (as in this example), the algorithm proceeds to step 510.

At step 510, the control circuit 114, 114' decreases the amount of current drawn by each load by a stepwise amount ($I_{step}$) according to equation (2):

$$I_{step-battery}=0.03*1*(2/(2+10))*2.01 \text{ A}=0.01005 \text{ A}$$

$$I_{step-pump}=0.03*1*(2/(2+10))*10.25 \text{ A}=0.25625 \text{ A}$$

Therefore, the new current for the battery equals $I_{battery}-I_{step-battery}$=2.01 A−0.01005 A=1.999 A and the new current for the pump equals $I_{pump}-I_{step-pump}$=10.25 A−0.25625 A=9.994 A. At step 510, the control circuit 114, 114' also draws the new total amount of the current $I_{total}$=1.999 A+9.994 A=11.99 A) assigned to each load from the solar array, senses the amount of voltage V from the solar array, calculates the new total power $P_{total}$ as the product of the voltage V and total current $I_{total}$. In this example, the voltage V increases to 30.5V and the total power $P_{total}$ increases to 365.8 W (i.e., 11.99 A*30.5V). The control circuit 114, 114' then repeats step 506 to determine whether the new total power $P_{total}$ is greater than the immediately previous total power $P_{previous}$. In this example, the new total power $P_{total}$=365.8 W is greater than the immediately previous total power $P_{previous}$=356 W, so the algorithm proceeds to step 512, in which the MPPT slope x is reset based on a difference between the new total power $P_{total}$ and the previous total power $P_{previous}$, and then repeats step 504. The control circuit 114, 114' continues to implement the algorithm 500 increasing, in a stepwise manner, the amount of current drawn by each load until the total power is not greater than the immediately previous value for total power, and decreasing, in a stepwise manner, the amount of current drawn by each load until the sensed power is greater than the immediately previously sensed power. Using this algorithm, the control circuit 114, 114' maintains the amount of power drawn from the solar array at an amount that is at least equal to 90% of the maximum peak power point for the solar array.

FIG. 11B illustrates another example implementation of algorithm 500 with two loads coupled to a solar array—a battery that has been assigned a 2× multiplier and a pump that has been assigned an 10× multiplier, and in which the amounts of current being drawn by the battery and the pump are initially unbalanced as compared to the multipliers (i.e., at step 502, the control circuit 114, 114' sets an initial value of current for the battery, $I_{battery}$=2 A and for the pump $I_{pump}$=10 A, in accordance with the 2× and 10× multipliers assigned to these loads). At step 502, the controller 114, 114' causes the loads to draw the total amount of current $I_{total}$=12 A (i.e., the sum of $I_{battery}+I_{pump}$=4 A+8 A), senses the voltage V=30V from the solar array, and determines the total power $P_{total}$=360 W (i.e., the product of $I_{total}*V$=12 A*30V). Next, at step 504, the control circuit 114, 114' increases the amount of current drawn by each load by a stepwise amount ($I_{step}$) that is a function of the multipliers $y_{battery}$=2× and $y_{pump}$=10× for each load, the initial current $I_{battery}$, $I_{pump}$ for each load, an MPPT slope x=0.03, and a ratio balance slope z=−0.5 for the battery and z=0.5 for the pump, according to equation (1):

$$I_{step\text{-}battery}=0.03*-0.5*(2/(2+10))*4\ A=-0.01\ A$$

$$I_{step\text{-}pump}=0.03*0.5*(2/(2+10))*8\ A=0.10\ A$$

Therefore, the new current for the battery equals $I_{battery}+I_{step\text{-}battery}=4\ A-0.01\ A=3.99\ A$ and the new current for the pump equals $I_{pump}+I_{step\text{-}pump}=8\ A+0.10\ A=8.10\ A$. At step 504, the control circuit 114, 114' also draws the new total amount of the current $I_{total}=3.99\ A+8.10\ A=12.09\ A$) assigned to each load from the solar array, senses the amount of voltage V from the solar array, calculates the new total power $P_{total}$ as the product of the voltage V and total current $I_{total}$. In this example, the voltage V drops to 29.2V and the total power $P_{total}$ drops to 353 W (i.e., 12.09 A*29.2V). At step 506, the control circuit 114, 114' determines whether the new total power $P_{total}$ is greater than the immediately previous total power $P_{previous}$. If yes, then the algorithm proceeds to step 508, in which the MPPT slope x is rest based on the difference between the new total power $P_{total}$ and the immediately previous total power $P_{previous}$. If not (as in this example), the algorithm proceeds to step 510.

At step 510, the control circuit 114, 114' decreases the amount of current drawn by each load by a stepwise amount ($I_{step}$) according to equation (2):

$$I_{step\text{-}battery}=-0.03*-0.5*(2/(2+10))*3.99\ A=-0.01\ A$$

$$I_{step\text{-}pump}=-0.03*0.5*(10/(2+10))*8.10\ A=0.1\ A$$

Therefore, the new current for the battery equals $I_{battery}-I_{step\text{-}battery}=3.99\ A-0.01\ A=3.98\ A$ and the new current for the pump equals $I_{pump}-I_{step\text{-}pump}=8.10\ A+0.1\ A=8.20\ A$. At step 510, the control circuit 114, 114' also draws the new total amount of the current $I_{total}=3.98\ A+8.20\ A=12.18\ A$) assigned to each load from the solar array, senses the amount of voltage V from the solar array, calculates the new total power $P_{total}$ as the product of the voltage V and total current $I_{total}$. In this example, the voltage V increases to 30.2V and the total power $P_{total}$ increases to 362 W (i.e., 12.18 A*30.2V). The control circuit 114, 114' then repeats step 506 to determine whether the new total power $P_{total}$ is greater than the immediately previous total power $P_{previous}$. In this example, the new total power $P_{total}=362$ W is greater than the immediately previous total power $P_{previous}=353$ W, so the algorithm proceeds to repeat step 504. The control circuit 114, 114' continues to implement the algorithm 500 decreasing the amount of current drawn by the pump and increasing the amount of current drawn by the battery until the total power is not greater than the immediately previous value for total power, and the current draw is closer to matching the multipliers assigned to the loads. Using this algorithm, the control circuit 114, 114' maintains the amount of power drawn from the solar array at an amount that is at least equal to 90% of the maximum peak power point for the solar array.

FIG. 11C illustrates another example implementation of algorithm 500 with three loads coupled to a solar array—a battery that has been assigned a 5× multiplier, a pump that has been assigned a 10× multiplier, and AC power grid that has been assigned a 10×. At step 502, the control circuit 114, 114' sets an initial value of current for the battery, $I_{battery}=5$ A, for the pump $I_{pump}=10$ A, and for the grid $I_{grid}=10$ A, in accordance with the 5×, 10×, and 10× multipliers assigned to these loads. At step 502, the controller 114, 114' also causes the loads to draw the total amount of current $I_{total}=25$ A (i.e., the sum of $I_{battery}+I_{pump}+I_{grid}=5\ A+10\ A+10\ A$), senses the voltage V=500V from the solar array, and determines the total power $P_{total}=12,500$ W (i.e., the product of $I_{total}*V=25\ A*500V$). Next, at step 504, the control circuit 114, 114' increases the amount of current drawn by each load by a stepwise amount ($I_{step}$) that is a function of the multipliers $y_{battery}=5×$, $y_{pump}=10×$, $y_{grid}=10×$ for each load, the current $I_{battery}$, $I_{pump}$, $I_{grid}$ for each load, an MPPT slope x=0.05, and a ratio balance slope z=1, according to equation (1):

$$I_{step\text{-}battery}=0.05*1*(5/(5+5+10))*5\ A=0.05\ A$$

$$I_{step\text{-}pump}=0.05*1*(10/(5+5+10))*10\ A=0.20\ A$$

$$I_{step\text{-}grid}=0.05*1*(10/(5+5+10))*10\ A=0.20\ A$$

Therefore, the new current for the battery equals $I_{battery}+I_{step\text{-}battery}=5\ A-0.05\ A=5.05\ A$, the new current for the pump equals $I_{pump}+I_{step\text{-}pump}=10\ A+0.20\ A=10.20\ A$, and for the grid equals $I_{grid}+I_{step\text{-}grid}=10\ A+0.20\ A=10.20\ A$. At step 504, the control circuit 114, 114' also draws the new total amount of the current $I_{total}=5.05\ A+10.20\ A+10.20\ A=25.45$ A) assigned to each load from the solar array, senses the amount of voltage V from the solar array, calculates the new total power $P_{total}$ as the product of the voltage V and total current $I_{total}$. In this example, the voltage V drops to 490V and the total power $P_{total}$ drops to 12,471 W (i.e., 25.45 A*490V). At step 506, the control circuit 114, 114' determines whether the new total power $P_{total}$ is greater than the immediately previous total power $P_{previous}$. If yes, then the algorithm proceeds to step 508, in which the MPPT slope x is rest based on the difference between the new total power $P_{total}$ and the immediately previous total power $P_{previous}$. If not, the algorithm proceeds to step 510. In this example the new total power $P_{total}=12,471$ W is less than the immediately previous total power $P_{previous}=12,500$ W, so the algorithm proceeds to step 510.

At step 510, the control circuit 114, 114' decreases the amount of current drawn by each load by a stepwise amount ($I_{step}$) according to equation (2):

$$I_{step\text{-}battery}=0.05*1*(5/(5+5+10))*5.05\ A=0.0505\ A$$

$$I_{step\text{-}pump}=0.05*1*(10/(5+5+10))*10.20\ A=0.204\ A$$

$$I_{step\text{-}grid}=0.05*1*(10/(5+5+10))*10.20\ A=0.204\ A$$

Therefore, the new current for the battery equals $I_{battery}-I_{step\text{-}battery}=5.05\ A+0.0505\ A=4.9995\ A$, the new current for the pump equals $I_{pump}-I_{step\text{-}pump}=10.20\ A-0.204\ A=9.996$ A, and the new current for the grid equals $I_{grid}-I_{step\text{-}grid}=10.20\ A-0.204\ A=9.996\ A$. At step 510, the control circuit 114, 114' also draws the new total amount of the current $I_{total}=4.9995\ A+9.996\ A+9.996\ A=24.9915\ A$) assigned to each load from the solar array, senses the amount of voltage V from the solar array, calculates the new total power $P_{total}$ as the product of the voltage V and total current $I_{total}$. In this example, the voltage V increases to 503V and the total power $P_{total}$ increases to 12,571 W (i.e., 24.9915 A*503V). The control circuit 114, 114' then repeats step 506 to determine whether the new total power $P_{total}$ is greater than the immediately previous total power $P_{previous}$. In this example, the new total power $P_{total}=12,571$ W is greater than the immediately previous total power $P_{previous}=12,471$ W, so the algorithm proceeds to repeat step 504. The control circuit 114, 114' continues to implement the algorithm 500 increasing, in a stepwise manner, the amount of current drawn by each load until the total power is not greater than the immediately previous value for total power, and decreasing, in a stepwise manner, the amount of current drawn by each load until the sensed power is greater than the immediately previously sensed power. Using this algorithm, the control circuit 114, 114' maintains the amount of power drawn from the solar array at an amount that is at least equal to 90% of the maximum peak power point for the solar array.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of the following claims.

What is claimed is:

1. A solar power system comprising:
   a solar array;
   a plurality of loads electrically coupled in parallel to the solar array; and
   a control circuit electrically coupled to the solar array and in communication with the loads,
   wherein the control circuit is configured to cause the solar array to operate at a maximum power point (MPP), prioritize power requirements of the loads, and variably allocate power from the solar array among the loads according to the prioritized power requirements of the loads by implementing a power division MPP algorithm in accordance with the prioritized power requirements of each of the loads by
   (a) setting an initial amount of current to be drawn by the each of the loads,
   (b) drawing a total of the initial current for each load from the solar array,
   (c) sensing a voltage of the solar array when the total current is drawn from the solar array,
   (d) calculating a total power drawn from the solar array as a product of the total current and the voltage,
   (e) if the total power is greater than an immediately preceding value of total power drawn by the solar array, increasing the amount of current drawn by each load until the total power drawn from the solar array is less than an immediately preceding value of total power drawn by the solar array, and (f) if the total power is less than an immediately preceding value of total power drawn by the solar array, decreasing the amount of current drawn by each load until the total power drawn from the solar array is less than an immediately preceding total power drawn by the solar array.

2. The solar power system of claim 1, wherein the control circuit is configured to assign a first priority multiplier to the first load and a second priority multiplier to the second load based on power requirements of each of the first and second loads and to allocate power from the solar array among the first and second loads according to the priority multipliers.

3. The solar power system of claim 2, wherein the control circuit is configured to assign a lower priority multiplier to the load requiring less power and a higher priority multiplier to the load requiring greater power.

4. The solar power system of claim 2, wherein the first load is an electrically powered device and the second load is a battery.

5. The solar power system of claim 4, wherein the control circuit is configured to assign the second multiplier to be zero and the first multiplier to be greater than zero when 100% of power is required for the electrically powered device.

6. The solar power system of claim 5, wherein the control circuit is configured to assign the first multiplier to be zero and the second multiplier to be greater than zero when no power is required for the electrically powered device.

7. The solar power system of claim 4, wherein the control circuit is configured to assign the second multiplier to be lower and the first multiplier to be higher when power is required for both the electrically powered device and the battery and the battery is charged to at least a threshold amount of its capacity.

8. The solar power system of claim 7, wherein the control circuit is configured to assign the second multiplier to be greater and the first multiplier to be lower when power is required for both the electrically powered device and the battery, the battery is charged to less than the threshold amount of its capacity, and the battery priority is higher than the electrically powered device.

9. The solar power system of claim 8, control circuit is configured to assign the second multiplier to be greater and the first multiplier to be lower when power is required for both the electrically powered device and the battery, the battery is charged to less than the threshold amount of its capacity, and the battery priority is lower than the electrically powered device.

10. The solar power system of claim 1, wherein the second load is an AC electrical power grid and the control circuit is configured to assign a first priority multiplier to the first load and a second priority multiplier to the second load based on power requirements of the first load and a price of power on the AC electrical power grid and to allocate power from the solar array among the first and second loads according to the priority multipliers.

11. The solar power system of claim 10, wherein the control circuit is configured to assign the second multiplier to be zero and the first multiplier to be greater than zero when 100% of power is required for the first load.

12. The solar power system of claim 11, wherein the control circuit is configured to assign the first multiplier to be zero and the second multiplier to be greater than zero when no power is required for the first load.

13. The solar power system of claim 10, wherein the control circuit is configured to assign the first multiplier to be lower and the second multiplier to be greater when a first threshold value corresponding an amount of power required by the first load is lower than a second threshold value corresponding to a price of power on the AC electric power grid.

14. The solar power system of claim 13, wherein the control circuit is configured to assign the first multiplier to be higher and the second multiplier to be lower when the first threshold is higher than the second threshold value.

15. The solar power system of claim 10, wherein the control circuit is configured to assign the first and second multipliers according to a mathematical relationship between an amount of power required by the first load and the price of power on the AC power grid.

16. The solar power system of claim 1, wherein the control circuit comprises a controller and at least one of a DC/DC converter and an inverter electrically coupling the solar array to the loads.

17. The solar power system of claim 16, further comprising one or more communications modules configured to communicate operational parameters among the controller, the at least one of a DC/DC converter and the inverter, and the loads.

18. The solar power system of claim 1, wherein increasing the amount of current drawn by each load includes increasing the current for each load in a stepwise manner as a function of the initial current and a priority multiplier for each load.

19. The solar power system of claim 18, wherein the amount of stepwise current increase for each load is determined by the equation $$I_{step} = x * z * (Y_n/Y_{total}) * I_n$$

where $I_{step}$ is the amount of current increase, x is an MPPT slope, z is a ratio balance slope, $y_n$ is the priority multiplier for the load, $y_{total}$ is the sum of the priority multipliers for all of the loads, and In is the initial current for the load.

20. The solar power system of claim 18, wherein decreasing the amount of current drawn by each load includes decreasing the current for each load in a stepwise manner as a function of the initial current and the priority multiplier for each load.

21. The solar power system of claim 20, wherein the amount of stepwise current decrease for each load is determined by the equation $$I_{step} = x * z * (Y_n/Y_{total}) * I_n$$

where $I_{step}$ is the amount of current increase, x is an MPPT slope, z is a ratio balance slope, $y_n$ is the priority multiplier for the load, $y_{total}$ is the sum of the priority multipliers for all of the loads, and In is the initial current for the load.

22. A solar power system comprising:
a solar array;
a plurality of controllers electrically coupled in parallel to the solar array;
a plurality of loads, each load electrically coupled to the solar array via one of the plurality of controllers;
a central control circuit configured to control operation of the system; and
a communications module configured to communicate with each of the plurality of controllers, wherein the central control circuit is configured to
(a) prioritize power distribution to each of the loads by dynamically assigning a priority multiplier to each of the plurality of loads based upon relative power requirements of each of the loads,
(b) cause the solar array to operate at a maximum power point (MPP) based on the priority multipliers assigned to each of the loads by dynamically adjusting an amount of power drawn by the solar array based on total power requirements of the loads, and
(c) cause the controllers to simultaneously deliver power from the solar array to the loads based on the priority multipliers assigned to each of the loads.

23. The solar power system of claim 22, wherein the control circuit is configured to increase the amount of current drawn by each load when the total power drawn from the solar array is less than an immediately preceding value of total power drawn by the solar array, and decrease the amount of current drawn by each load when the total power drawn from the solar array is less than an immediately preceding total power drawn by the solar array.

* * * * *